(12) United States Patent
Tanaka et al.

(10) Patent No.: US 9,883,123 B2
(45) Date of Patent: Jan. 30, 2018

(54) SOLID-STATE IMAGING DEVICE AND IMAGING SYSTEM USING A BIT REDUCTION METHOD BASED ON A REDUCED PIXEL SIGNAL

(71) Applicant: OLYMPUS CORPORATION, Hachioji-shi, Tokyo (JP)

(72) Inventors: Yoshinobu Tanaka, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/234,608

(22) Filed: Aug. 11, 2016

(65) Prior Publication Data

US 2016/0353035 A1    Dec. 1, 2016

Related U.S. Application Data

(63) Continuation of application No. PCT/JP2015/052493, filed on Jan. 29, 2015.

(30) Foreign Application Priority Data

Feb. 20, 2014    (JP) ................................ 2014-030604

(51) Int. Cl.
*H04N 5/351* (2011.01)
*H04N 5/232* (2006.01)
(Continued)

(52) U.S. Cl.
CPC ......... *H04N 5/351* (2013.01); *H04N 5/23229* (2013.01); *H04N 5/23235* (2013.01);
(Continued)

(58) Field of Classification Search
CPC ............... H04N 5/351; H04N 5/23229; H04N 5/23235; H04N 5/23241; H04N 5/23245; H04N 5/243
See application file for complete search history.

(56) References Cited

U.S. PATENT DOCUMENTS

| | | | |
|---|---|---|---|
| 8,248,494 B2 * | 8/2012 | Du | ......................... G06T 5/009 348/254 |
| 2007/0103745 A1 * | 5/2007 | Ogata | ..................... G06T 5/009 358/521 |
| 2009/0290040 A1 * | 11/2009 | Du | ......................... G06T 5/009 348/222.1 |

FOREIGN PATENT DOCUMENTS

| | | |
|---|---|---|
| JP | 9-44634 A | 2/1997 |
| JP | 2007-325140 A | 12/2007 |

(Continued)

OTHER PUBLICATIONS

International Search Report dated Apr. 28, 2015, issued in counterpart International Application No. PCT/JP2015/052493, with English translation (2 pages).

*Primary Examiner* — Nicholas Giles
(74) *Attorney, Agent, or Firm* — Westerman, Hattori, Daniels & Adrian

(57) ABSTRACT

A solid-state imaging device includes a pixel signal processing unit which has a plurality of pixels disposed in a two-dimensional matrix, outputs each of pixel signals generated by all pixels as a total pixel signal, and outputs each of the pixel signals generated by the pixels with the number of pixels reduced to a prescribed number of pixels as a reduced pixel signal, a bit reduction method determination unit which determines a bit reduction method for reducing the number of pixels of a digital value representing the amount of the total pixel signal based on the reduced pixel signal, and a bit reduction unit which reduces the number of (Continued)

bits of the digital value based on the bit reduction method and outputs the digital value with the reduced number of bits as a digital value corresponding to the total pixel signal.

10 Claims, 8 Drawing Sheets

(51) Int. Cl.
*H04N 5/243* (2006.01)
*H04N 5/369* (2011.01)
*H04N 5/374* (2011.01)
*H04N 5/378* (2011.01)
*H04N 9/04* (2006.01)

(52) U.S. Cl.
CPC ..... *H04N 5/23241* (2013.01); *H04N 5/23245* (2013.01); *H04N 5/243* (2013.01); *H04N 5/23293* (2013.01); *H04N 5/3698* (2013.01); *H04N 5/374* (2013.01); *H04N 5/378* (2013.01); *H04N 9/045* (2013.01); *H04N 2209/045* (2013.01)

(56) References Cited

FOREIGN PATENT DOCUMENTS

| JP | 2009-182412 A | 8/2009 |
|----|---------------|--------|
| JP | 2009-296353 A | 12/2009 |

* cited by examiner

SOLID-STATE IMAGING DEVICE AND IMAGING SYSTEM USING A BIT REDUCTION METHOD BASED ON A REDUCED PIXEL SIGNAL

Priority is claimed on Japanese Patent Application No. 2014-030604, filed on Feb. 20, 2014, and International Application No. PCT/JP2015/052493, filed on Jan. 29, 2015, the contents of which are incorporated herein by reference.

BACKGROUND OF THE INVENTION

Field of the Invention

The present invention relates to a solid-state imaging device and an imaging system.

Description of Related Art

In recent years, imaging systems, such as a video camera and an electronic still camera, have become widespread. In these imaging systems, a charge coupled device (CCD) solid-state imaging device or a complementary metal oxide semiconductor (CMOS) solid-state imaging device is mounted. In these solid-state imaging devices, a plurality of pixels are arranged in a two-dimensional matrix, and a signal charge generated by a photoelectric conversion unit, such as a photodiode, provided in a pixel, on which light is incident, is amplified by an amplification unit provided in the pixel and is output as a pixel signal. At this time, in a general CMOS solid-state imaging device, hitherto, the pixel signals from the pixels arranged in a two-dimensional matrix have been sequentially read for each row.

A CMOS solid-state imaging device can be manufactured using a general semiconductor manufacturing process while a CCD solid-state imaging device is manufactured by a dedicated manufacturing process. From this, the CMOS solid-state imaging device easily realizes multifunctionality by various functional circuits being incorporated into a solid-state imaging device, like a system on chip (SOC). For this reason, in a CMOS solid-state imaging device (hereinafter, referred to as a "solid-state imaging device") mounted in an imaging system, there are an increasing number of examples where a solid-state imaging device has an internal analog-to-digital conversion circuit and pixel data obtained by performing analog-to-digital conversion on the pixel signals read from the pixels is output.

With recent increases in the speed of solid-state imaging devices, a transfer rate of pixel data between a solid-state imaging device in an imaging system and an image processing unit has been improved. In solid-state imaging devices, it is known that an improvement of a data transfer rate is coped with by improving a clock frequency when transferring pixel data to be output corresponding to a low voltage differential signaling system (LVDS), which is a differential interface system, or by increasing the bus width of a data bus for transferring pixel data to an image processing unit.

However, if the clock frequency in transferring pixel data from the solid-state imaging device to the image processing unit increases or the bus width of the data bus increases, the power consumption of the solid-state imaging device also increases. For this reason, a conventional general solid-state imaging device is provided with a mechanism for changing the number of bits of pixel data of one pixel (see Japanese Unexamined Patent Application, First Publication No. 2009-182412).

In an imaging system in which a solid-state imaging device provided with a mechanism for changing the number of bits of pixel data is mounted, the number of bits of pixel data transferred from the solid-state imaging device to the image processing unit is changed according to the operation mode of the imaging system. For example, in a case where the operation mode of the imaging system is a still image mode for capturing a still image, 12-bit pixel data is transferred from the solid-state imaging device to the image processing unit, and in a case of the operation mode for capturing a moving image, 10-bit pixel data is transmitted from the solid-state imaging device to the image processing unit. Furthermore, for example, in a case where the operation mode of the imaging system is a live view mode for displaying a confirmation image (a live view image (through image)) for confirming an object to be imaged on a display device, 9-bit pixel data is transferred, whereby the number of bits of pixel data transferred from the solid-state imaging device to the image processing unit is further reduced.

In this way, in an imaging system in which a solid-state imaging device provided with a mechanism for changing the number of bits of pixel data is mounted, the number of bits of pixel data transferred from the solid-state imaging device to the image processing unit is changed according to the operation mode, thereby reducing the power consumption of the solid-state imaging device and the imaging system.

SUMMARY OF THE INVENTION

A solid-state imaging device in accordance with an embodiment of the present invention includes: a pixel signal processing unit which has a plurality of pixels disposed in a two-dimensional matrix, outputs each of pixel signals generated by all of the plurality of pixels disposed as a total pixel signal, and outputs each of the pixel signals generated by the plurality of pixels with the number of pixels reduced to a prescribed number of pixels as a reduced pixel signal; a bit reduction method determination unit which determines a bit reduction method for reducing the number of bits of a digital value representing an amount of the total pixel signal based on the reduced pixel signal; and a bit reduction unit which reduces the number of bits of the digital value based on the bit reduction method determined by the bit reduction method determination unit and outputs the digital value with the reduced number of bits as a digital value corresponding to the total pixel signal.

In the solid-state imaging device, the reduced pixel signal may be a pixel signal obtained by averaging the pixel signals generated by a plurality of corresponding pixels among the plurality of pixels in a same exposure period.

In the solid-state imaging device, the reduced pixel signal may be a pixel signal generated by one prescribed pixel among the pixel signals generated by a plurality of corresponding pixels among the plurality of pixels in the same exposure period.

The solid-state imaging device may further include: a difference calculation unit which outputs a digital value of a difference between the digital value representing the amount of the total pixel signal and a digital value representing an amount of the reduced pixel signal. The bit reduction unit may reduce the number of bits of the digital value of the difference based on the bit reduction method and outputs the digital value of the difference with the reduced number of bits as the digital value corresponding to the total pixel signal.

In the solid-state imaging device, the bit reduction method determination unit may examine an entire dynamic range of the total pixel signal based on the reduced pixel signal and determine the number of bits allocated to the digital value corresponding to the total pixel signal according to a level of the examined dynamic range.

In the solid-state imaging device, the bit reduction method determination unit may examine an entire brightness distribution of the total pixel signal based on the reduced pixel signal and determine the range of bits allocated to the digital value corresponding to the total pixel signal based on the examined brightness distribution.

In the solid-state imaging device, the bit reduction method determination unit may examine an entire contrast value of the total pixel signal based on the reduced pixel signal and determine the number of bits allocated to the digital value corresponding to the total pixel signal according to a level of the examined contrast value.

An imaging system in accordance with an embodiment of the present invention includes the solid-state imaging device. The bit reduction method determination unit may determine the bit reduction method based on information representing conditions for performing imaging with the solid-state imaging device in addition to the reduced pixel signal.

In the imaging system, the information representing the conditions for performing imaging may be control information of a lens including at least one of aperture information and focusing information of the lens which forms an optical image of an object on the solid-state imaging device.

DETAILED DESCRIPTION OF THE INVENTION

Figure 1:
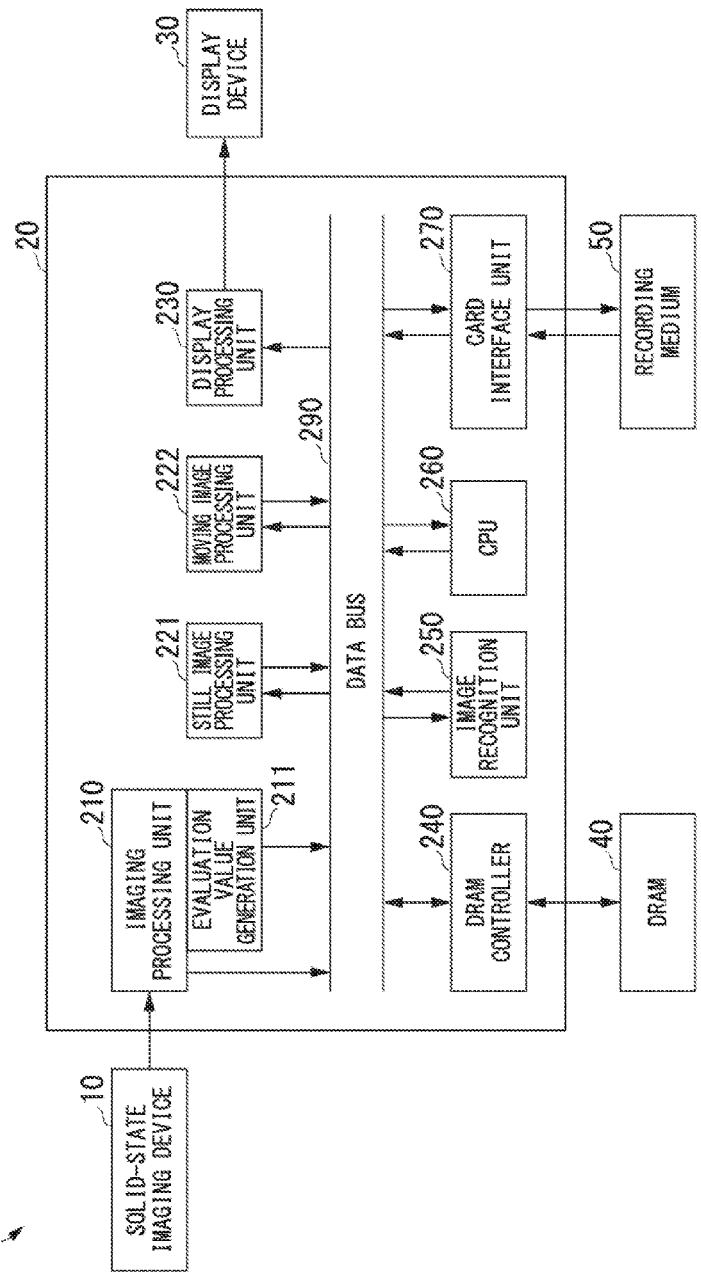
FIG. 1 is a block diagram showing the schematic configuration of an imaging system in which a solid-state imaging device is mounted in an embodiment of the invention.

Hereinafter, an embodiment of the invention will be described referring to the drawings. FIG. 1 is a block diagram showing the schematic configuration of an imaging system in which a solid-state imaging device is mounted in this embodiment. In FIG. 1, an imaging system 1 includes a solid-state imaging device 10, an image processing unit 20, a display device 30, a dynamic random access memory (DRAM) 40, and a recording medium 50. The image processing unit 20 includes an imaging processing unit 210, an evaluation value generation unit 211, a still image processing unit 221, a moving image processing unit 222, a display processing unit 230, a DRAM controller 240, an image recognition unit 250, a CPU 260, and a card interface unit 270.

The solid-state imaging device 10 is the solid-state imaging device of this embodiment which photoelectrically converts an optical image of an object formed by a lens (not shown). The solid-state imaging device 10 outputs pixel data based on pixel signals according to object light to the imaging processing unit 210 in the image processing unit 20. The solid-state imaging device 10 will be described below.

The image processing unit 20 generates an image subjected to various kinds of prescribed image processing based on pixel data input from the solid-state imaging device 10 and transfers (writes) data (hereinafter, referred to as "image data") of the generated image to the DRAM 40. The image processing unit 20 reads image data stored in the DRAM 40 and subjects image data to various kinds of prescribed image processing.

The imaging processing unit 210, the evaluation value generation unit 211, the still image processing unit 221, the moving image processing unit 222, the display processing unit 230, the DRAM controller 240, the image recognition unit 250, the CPU 260, and the card interface unit 270 in the imaging system 1 are connected to one another through a data bus 290. For example, reading of data from the DRAM 40 connected to the DRAM controller 240 and writing of data to the DRAM 40 are performed by direct memory access (DMA).

The imaging processing unit 210 subjects pixel data input from the solid-state imaging device 10 to pre-processing, such as shading correction or pixel defect correction and transfers (writes) image data (hereinafter, referred to as "pre-processed image data") as a result of the pre-processing to the DRAM 40.

The evaluation value generation unit 211 provided in the imaging processing unit 210 generates an evaluation value for controlling auto exposure (AE), auto focus (AF), or auto white balance (AWB) based on pre-processed image data as a result of the pre-processing and transfers (writes) the generated evaluation value to the DRAM 40.

The still image processing unit 221 acquires (reads) pre-processed image data stored in the DRAM 40 and performs various kinds of image processing for recording a still image including demosaic processing (denoising, YC conversion processing, resize processing) and JPEG compression processing to generate still image data. The still image processing unit 221 acquires (reads) still image data recorded in the DRAM 40 and performs various kinds of image processing for reproducing a still image including JPEG decompression processing to generate still image data for display. The still image processing unit 221 transfers (writes) the generated still image data and still image data for display to the DRAM 40.

The moving image processing unit 222 acquires (reads) pre-processed image data recorded in the DRAM 40 and performs various kinds of image processing for recording a moving image including demosaic processing (denoising, YC conversion processing, resize processing) and moving image compression processing, such as MPEG compression processing or H.264 compression processing, to generate moving image data. The moving image processing unit 222 may generate moving image data for display for reproducing a moving image without subjecting image data subjected to demosaic processing to moving image compression processing. The moving image processing unit 222 acquires (reads)

moving image data recorded in the DRAM 40 and performs various kinds of image processing for reproducing a moving image including moving image decompression processing, such as MPEG decompression processing or H.264 decompression processing, to generate moving image data for display. The moving image processing unit 222 transfers (writes) the generated moving image data and moving image data for display to the DRAM 40.

The display processing unit 230 acquires (reads) image data for display recorded in the DRAM 40 and subjects the acquired image data for display to display processing, such as processing for superimposing data for on-screen display (OSD). The display processing unit 230 outputs and displays image data after the display processing to and on the display device 30.

The display device 30 is a display device, such as a thin-film transistor (TFT) liquid crystal display (LCD) or an electronic view finder (EVF), and displays an image according to image data after the display processing output from the display processing unit 230. The display device 30 may be an external display, such as an organic electro luminescence (EL) display, or a television.

The image recognition unit 250 acquires (reads) pre-processed image data recorded in the DRAM 40, detects a motion amount or a face of an object included in a captured image based on the acquired pre-processed image data, generates information of the detected object, and transfers (writes) the generated information to the DRAM 40. The image recognition unit 250 recognizes a scene of the captured image based on the acquired pre-processed image data, generates information of the recognized scene, and transfers (writes) the generated information to the DRAM 40. The image recognition unit 250 may hold the generated information of the object or information of the scene in a register in the image recognition unit 250 without transferring information to the DRAM 40.

The card interface unit 270 acquires (reads) still image data or moving image data recorded in the DRAM 40 and records the acquired image data in the recording medium 50. The card interface unit 270 reads still image data or moving image data recorded in the recording medium 50 and transfers (writes) the read image data to the DRAM 40.

The recording medium 50 is a recording medium, such as an SD memory card, and records still image data or moving image data output from the card interface unit 270. Still image data or moving image data recorded by the card interface unit 270 is read. In FIG. 1, although the recording medium 50 is included as a component of the imaging system 1, the recording medium 50 is detachably mounted in the imaging system 1.

The DRAM controller 240 performs the transfer (write) of data to the DRAM 40 connected thereto and the acquisition (read) of data from the DRAM 40 according to an access request to the DRAM 40 from a plurality of components in the imaging system 1 connected to the data bus 290, for example, a DMA access request.

The DRAM 40 is a memory in which access control is performed by the DRAM controller 240. The DRAM 40 temporarily stores various kinds of data during processing of the components in the imaging system 1.

The CPU 260 controls the components of the imaging system 1, that is, the entire imaging system 1. For example, the CPU 260 controls the operations of the components in the imaging system 1 according to an imaging operation or a reproduction operation in the imaging system 1. Furthermore, for example, the CPU 260 controls a lens (not shown) when the imaging system 1 performs the imaging operation.

First Embodiment

Figure 2:
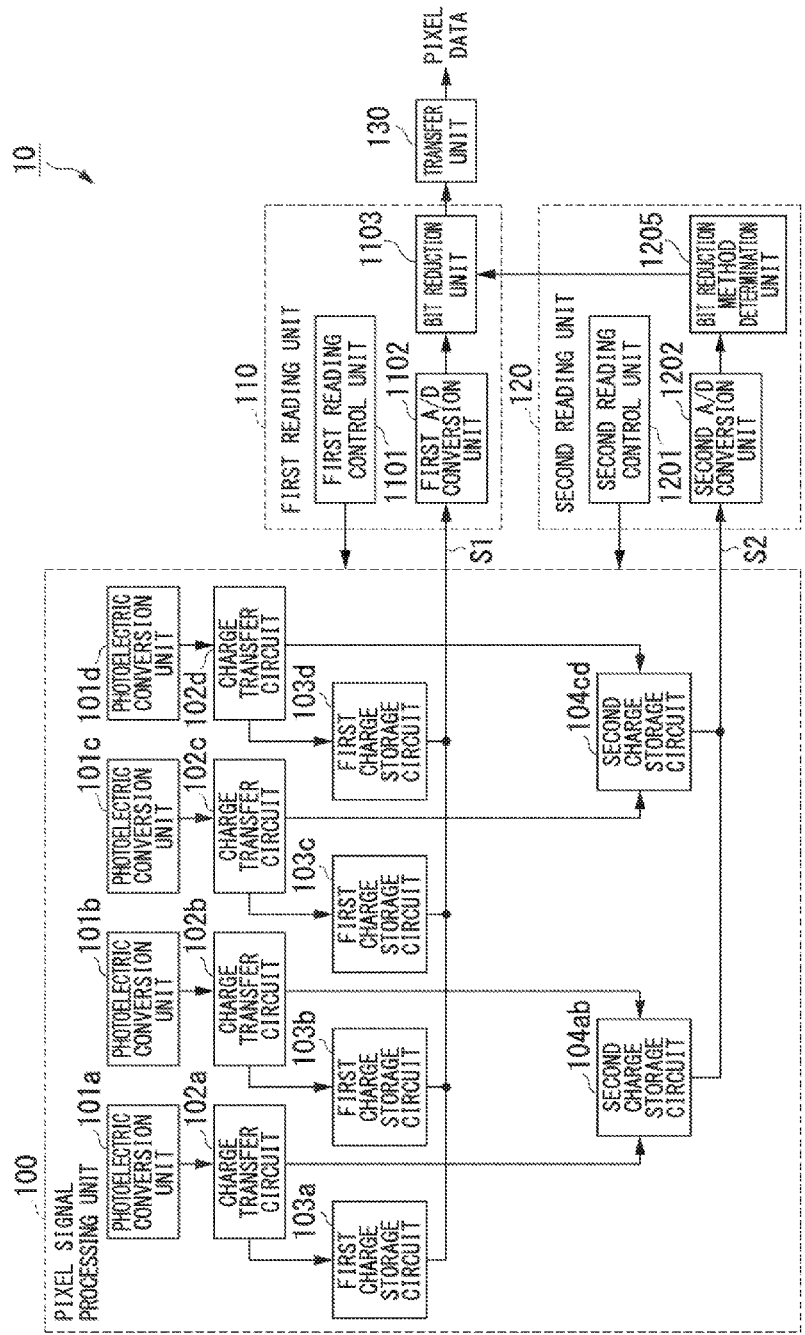
FIG. 2 is a block diagram showing the schematic configuration of a solid-state imaging device in a first embodiment of the invention.

Next, the solid-state imaging device 10 mounted in the imaging system 1 of this embodiment will be described. FIG. 2 is a block diagram showing the schematic configuration of a solid-state imaging device 10 in a first embodiment. The solid-state imaging device 10 shown in FIG. 2 has a pixel signal processing unit 100, a first reading unit 110, a second reading unit 120, and a transfer unit 130.

The pixel signal processing unit 100 includes a pixel array in which a plurality of pixels are formed to be arranged in a two-dimensional matrix. The pixel signal processing unit 100 outputs pixel signals obtained by photoelectrically converting light incident on the pixels to the corresponding one of the first reading unit 110 or the second reading unit 120 according to a reading control signal input from each of the first reading unit 110 and the second reading unit 120. The pixel signal processing unit 100 can separately output each of the pixel signals of all pixels disposed in the pixel array as a total pixel signal S1 and each of the pixel signals of pixels with the number of pixels disposed in the pixel array reduced as a reduced pixel signal S2. The pixel signal processing unit 100 outputs each total pixel signal S1 to the first reading unit 110 according to the reading control signal input from the first reading unit 110. The pixel signal processing unit 100 outputs each reduced pixel signal S2 to the second reading unit 120 according to the reading control signal input from the second reading unit 120.

The first reading unit 110 reads each total pixel signal S1 from the pixel signal processing unit 100 and outputs a digital value obtained by performing analog-to-digital conversion on each read total pixel signal S1 to the transfer unit 130. At this time, the first reading unit 110 reduces the number of bits of each total pixel signal S1 subjected to analog-to-digital conversion and output according to a bit reduction control signal input from the second reading unit 120 and outputs each total pixel signal S1 to the transfer unit 130.

The second reading unit 120 reads each reduced pixel signal S2 from the pixel signal processing unit 100 and determines a method of reducing the number of bits of the digital value of each total pixel signal S1 subjected to analog-to-digital conversion and output from the first reading unit 110 based on each read reduced pixel signal S2. The second reading unit 120 outputs a bit reduction control signal representing the determined bit reduction method to the first reading unit 110.

The transfer unit 130 transfers the digital value of each total pixel signal S1 with the reduced number of bits output from the first reading unit 110 to the outside as pixel data. That is, the transfer unit 130 transfers (outputs) pixel data with the reduced number of bits to the imaging processing unit 210 in the image processing unit 20.

With this configuration, the solid-state imaging device 10 reduces the number of bits of each piece of pixel data of based on the pixel signals of all pixels provided in the pixel signal processing unit 100 and outputs pixel data to the imaging processing unit 210 in the image processing unit 20.

Next, the components of the solid-state imaging device 10 of the first embodiment will be described in more detail. First, the configuration of the pixel signal processing unit 100 of the solid-state imaging device 10 of the first embodiment shown in FIG. 2 will be described in more detail. In the solid-state imaging device 10, as described above, although the pixel array having a plurality of pixels disposed in a two-dimensional matrix is provided in the pixel signal processing unit 100, for ease of description. FIG. 2 shows an example of a case where four pixels including a pixel a to a pixel d are disposed in the pixel signal processing unit 100 provided in the solid-state imaging device 10. Although the solid-state imaging device 10 is provided with components, such as a vertical scanning circuit and a horizontal scanning circuit, which drive the components of the pixels disposed in the pixel signal processing unit 100 under the control of a control device (for example, the CPU 260 or the like in the image processing unit 20), which is provided in the imaging system 1 with the solid-state imaging device 10 mounted therein and controls the solid-state imaging device 10, these components are not shown in FIG. 2.

In the following description, in order to distinguish the pixels corresponding to the components, that is, the pixel a to the pixel d, the mark "a", "b", "c", or "d" indicating the corresponding pixel is attached to the end of the reference numeral of each component. Specifically, "a" is attached to the end of the reference numeral of each component corresponding to the pixel a. "b" is attached to the end of the reference numeral of each component corresponding to the pixel b, "c" is attached to the end of the reference numeral of each component corresponding to the pixel c, and "d" is attached to the end of the reference numeral of each component corresponding to the pixel d. The marks "a" to "d" are not attached to the components commonly corresponding to the pixel a to the pixel d. In a case where a component corresponds to one of the pixel a to the pixel d, but the corresponding pixel is not distinguished for description, the marks "a" to "d" are not shown, and only the reference numerals of the components are shown.

The pixel signal processing unit 100 of the solid-state imaging device 10 of the first embodiment shown in FIG. 2 has four photoelectric conversion units 101a to 101d, four charge transfer circuits 102a to 102d, four first charge storage circuits 103a to 103d, and two second charge storage circuits 104ab and 104cd. In the pixel signal processing unit 100 of the solid-state imaging device 10 of the first embodiment shown in FIG. 2, the components including the photoelectric conversion unit 101a, the charge transfer circuit 102a, and the first charge storage circuit 103a constitute the pixel a, and the components including the photoelectric conversion unit 101b, the charge transfer circuit 102b, and the first charge storage circuit 103b constitute the pixel b. Furthermore, the components including the photoelectric conversion unit 101c, the charge transfer circuit 102c, and the first charge storage circuit 103c constitute the pixel c, and the components including the photoelectric conversion unit 101d, the charge transfer circuit 102d, and the first charge storage circuit 103d constitute the pixel d. The second charge storage circuit 104ab is a common component for the pixel a and the pixel b, and the second charge storage circuit 104cd is a common component for the pixel c and the pixel d.

Each of the photoelectric conversion unit 101a to the photoelectric conversion unit 101d is a photoelectric conversion unit, such as a photodiode, which photoelectrically converts incident light to generate a signal charge and stores the generated signal charge.

Each of the charge transfer circuit 102a to the charge transfer circuit 102d is a circuit which transfers the signal charge generated and stored in the corresponding one of the photoelectric conversion unit 101a to the photoelectric conversion unit 101d to the corresponding one of the first charge storage circuit 103a to the first charge storage circuit 103d and the corresponding one of the second charge storage circuit 104ab and the second charge storage circuit 104cd.

Each of the first charge storage circuit 103a to the first charge storage circuit 103d is a circuit which holds (stores) the signal charge transferred from the corresponding one of the charge transfer circuit 102a to the charge transfer circuit 102d and generated in the corresponding one of the photoelectric conversion unit 101a to the photoelectric conversion unit 101d. Furthermore, each of the first charge storage circuit 103a to the first charge storage circuit 103d is a circuit which outputs, according to the reading control signal input from a first reading control unit 1101 in the corresponding first reading unit 110, a signal voltage according to the held signal charge as each pixel signal of the total pixel signals S1 to a first A/D conversion unit 1102 in the first reading unit 110.

Each of the second charge storage circuit 104ab and the second charge storage circuit 104cd is a circuit (averaged charge storage circuit) which holds (stores) a signal charge of a charge amount obtained by averaging the charge amount of the signal charge transferred from the corresponding one of the charge transfer circuit 102a to the charge transfer circuit 102d and generated in the corresponding one of the photoelectric conversion unit 101a to the photoelectric conversion unit 101d, or a signal charge for averaging the charge amount of the signal charge. That is, each of the second charge storage circuit 104ab and the second charge storage circuit 104cd is a circuit which adds and averages the signal charges of the pixels provided in the pixel signal processing unit 100 of the solid-state imaging device 10 and holds a signal charge for placing a state in which the number of pixels provided in the pixel signal processing unit 100 is reduced. Furthermore, each of the second charge storage circuit 104ab and the second charge storage circuit 104cd is a circuit which outputs, according to the reading control signal input from a second reading control unit 1201 in the corresponding second reading unit 120, a signal voltage according to the held signal charge as each reduced pixel signal S2 in a state of the reduced number of pixels to a second A/D conversion unit 1202 in the second reading unit 120.

In the pixel signal processing unit 100 of the solid-state imaging device 10 of the first embodiment shown in FIG. 2, the second charge storage circuit 104ab corresponds to the charge transfer circuit 102a and the charge transfer circuit 102b, that is, the photoelectric conversion unit 101a and the photoelectric conversion unit 101b. Furthermore, the second charge storage circuit 104cd corresponds to the charge transfer circuit 102c and the charge transfer circuit 102d, that is, the photoelectric conversion unit 101c and the photoelectric conversion unit 101d.

A configuration which adds and averages the signal charges of the pixels to reduce the number of pixels may be, for example, a configuration in which the signal charges generated in the photoelectric conversion unit 101a and the photoelectric conversion unit 101b are added and averaged for holding the signal charges in the second charge storage circuit 104ab, a configuration in which the signal charges held in the second charge storage circuit 104ab are added and averaged for outputting a signal voltage of each signal charge, or the like. For example, a configuration in which the signal charges held in the second charge storage circuit 104ab are added and averaged after outputting a signal voltage according to each signal charge may be made.

With such a configuration, the pixel signal processing unit 100 exposes the pixels in the same exposure period, holds the signal charges generated in the pixels by the photoelectric conversion units 101 in the first charge storage circuits 103, and holds the signal charges (the signal charges with the reduced number of pixels) obtained by averaging the signal charges in the second charge storage circuits 104. Specifically, the pixel signal processing unit 100 holds the signal charge generated by the photoelectric conversion unit 101*a* in the first charge storage circuit 103*a*. The pixel signal processing unit 100 holds the signal charge generated by the photoelectric conversion unit 101*b* in the first charge storage circuit 103*b*. The pixel signal processing unit 100 holds the signal charge generated by the photoelectric conversion unit 101*c* in the first charge storage circuit 103*c*. The pixel signal processing unit 100 holds the signal charge generated by the photoelectric conversion unit 101*d* in the first charge storage circuit 103*d*. The pixel signal processing unit 100 holds the signal charge obtained by averaging the signal charge generated by the photoelectric conversion unit 101*a* and the signal charge generated by the photoelectric conversion unit 101*b* in the second charge storage circuit 104*ab*. The pixel signal processing unit 100 holds the signal charge obtained by averaging the signal charge generated by the photoelectric conversion unit 101*c* and the signal charge generated by the photoelectric conversion unit 101*d* in the second charge storage circuit 104*cd*. The pixel signal processing unit 100 separately outputs the pixel signals according to the signal charges in the first charge storage circuits 103 and the pixel signals according to the signal charges held in the second charge storage circuits 104. That is, the pixel signal processing unit 100 separately outputs each of the pixel signals (total pixel signal S1) of all pixels provided in the pixel signal processing unit 100 and each of the pixel signals (reduced pixel signal S2) with the number of pixels provided in the pixel signal processing unit 100 reduced based on the signal charges obtained by the same single exposure.

In the solid-state imaging device 10 of the first embodiment shown in FIG. 2, the configuration of the pixel signal processing unit 100 which includes the second charge storage circuits 104 configured to hold the signal charges obtained by averaging the charge amounts of the signal charges generated by the photoelectric conversion units 101 provided in the pixels with two prescribed pixels as a set has been described. However, in an actual solid-state imaging device, for example, color filters of a Bayer array are attached to the pixel array having a plurality of pixels disposed in a two-dimensional matrix, and the photoelectric conversion units 101 provided in the pixels photoelectrically convert the colors corresponding to the attached color filters included in incident light to generate the signal charges. Accordingly, in the solid-state imaging device 10 of the first embodiment, it is preferable that the sets of pixels are constituted such that the centers of gravity of the colors of the attached color filters are not deviated and the signal charges of different colors are not averaged.

In the pixel signal processing unit 100 of the solid-state imaging device 10 of the first embodiment shown in FIG. 2, a configuration in which the second charge storage circuit 104*ab* and the second charge storage circuit 104*cd* add and average the signal charges generated by the photoelectric conversion unit 101*a* to the photoelectric conversion unit 101*d* to reduce the number of pixels has been described. However, a method of reducing the number of pixels is not limited only to addition-averaging shown in FIG. 2, and for example, a configuration in which the pixels are thinned to reduce the number of pixels may be made. In this case, in the pixel signal processing unit 100 of the solid-state imaging device 10 of the first embodiment shown in FIG. 2, a configuration in which the second charge storage circuit 104*ab* and the second charge storage circuit 104*cd* hold (store) one of the signal charges generated by the photoelectric conversion unit 101*a* to the photoelectric conversion unit 101*d* to thin the pixels is considered.

Next, the configuration of the first reading unit 110 of the solid-state imaging device 10 of the first embodiment shown in FIG. 2 will be described in more detail. The first reading unit 110 of the solid-state imaging device 10 of the first embodiment shown in FIG. 2 has a first reading control unit 1101, a first A/D conversion unit 1102, and a bit reduction unit 1103.

The first reading control unit 1101 sequentially outputs the reading control signal for sequentially reading the total pixel signals S1 from the first charge storage circuit 103*a* to the first charge storage circuit 103*d* in the pixel signal processing unit 100 to the first charge storage circuit 103*a* to the first charge storage circuit 103*d*.

The first A/D conversion unit 1102 is an A/D conversion circuit which performs analog-to-digital conversion on each total pixel signal S1 (analog signal) read by the first reading control unit 1101 and sequentially input from each of the first charge storage circuit 103*a* to the first charge storage circuit 103*d* and sequentially outputs a value (digital value) representing the amount of each total pixel signal S1 (analog signal) to the bit reduction unit 1103.

The bit reduction unit 1103 reduces the number of bits of the digital value of each total pixel signal S1 sequentially input from the first A/D conversion unit 1102 according to the bit reduction control signal input from the bit reduction method determination unit 1205 in the second reading unit 120 by a prescribed method and outputs the digital value of each total pixel signal S1 with the reduced number of pixels to the transfer unit 130. A method in which the bit reduction unit 1103 reduces the number of bits of the digital value according to the bit reduction control signal will be described below.

With such a configuration, the first reading unit 110 reads each total pixel signal S1 held in the first charge storage circuit 103 in the pixel signal processing unit 100 and outputs the digital value obtained by performing analog-to-digital conversion on each read total pixel signal S1 to the transfer unit 130. At this time, the first reading unit 110 reduces the number of bits of the digital value of each total pixel signal S1 subjected to analog-to-digital conversion and output according to the bit reduction control signal input from the second reading unit 120 and outputs the digital value to the transfer unit 130. With this, the transfer unit 130 outputs the digital value of the total pixel signal S1 with the reduced number of bits subjected to analog-to-digital conversion input from the first reading unit 110 as pixel data with the reduced number of bits to the outside.

Next, the configuration of the second reading unit 120 of the solid-state imaging device 10 of the first embodiment shown in FIG. 2 will be described in more detail. The second reading unit 120 of the solid-state imaging device 10 of the first embodiment shown in FIG. 2 has a second reading control unit 1201, a second A/D conversion unit 1202, and a bit reduction method determination unit 1205.

The second reading control unit 1201 sequentially outputs the reading control signal for sequentially reading each reduced pixel signal S2 from the second charge storage circuit 104*ab* and the second charge storage circuit 104*cd* in the pixel signal processing unit 100 to the second charge storage circuit 104*ab* and the second charge storage circuit 104*cd*.

The second A/D conversion unit 1202 is an A/D conversion circuit which performs analog-to-digital conversion on each reduced pixel signal S2 (analog signal) read by the second reading control unit 1201 and sequentially input from each of the second charge storage circuit 104*ab* and the second charge storage circuit 104*cd* and sequentially outputs a value (digital value) representing the amount of each reduced pixel signal S2 (analog signal) to the bit reduction method determination unit 1205.

In a case of a configuration in which each of the second charge storage circuit 104*ab* and the second charge storage circuit 104*cd* in the pixel signal processing unit 100 outputs the signal voltage according to each held signal charge as it is without performing addition-averaging, a configuration in which the second A/D conversion unit 1202 sequentially outputs the digital value having the amount obtained by adding and averaging the signal voltage output from each of the second charge storage circuit 104*ab* and the second charge storage circuit 104*cd* to the bit reduction method determination unit 1205 may be made. In this case, the second A/D conversion unit 1202 may add and average each signal voltage sequentially output from each of the second charge storage circuit 104*ab* and the second charge storage circuit 104*cd* by the second reading control unit 1201 in a state of an analog signal and may then perform analog-to-digital conversion on each signal voltage, or may perform analog-to-digital conversion on each signal voltage and may then add and average each signal voltage in a state of a digital value.

The bit reduction method determination unit 1205 determines the bit reduction method, in which the bit reduction unit 1103 in the first reading unit 110 reduces the number of bits of the digital value of each total pixel signal S1, based on the digital value of each reduced pixel signal S2 sequentially input from the second A/D conversion unit 1202 and outputs the bit reduction control signal representing the determined bit reduction method to the bit reduction unit 1103 in the first reading unit 110.

With such a configuration, the second reading unit 120 reads each reduced pixel signal S2 held in each second charge storage circuit 104 in the pixel signal processing unit 100 and determines the bit reduction method to the digital value of each total pixel signal S1 in the first reading unit 110 based on each digital value obtained by performing analog-to-digital conversion on each read reduced pixel signal S2. The second reading unit 120 outputs the bit reduction control signal representing the determined bit reduction method to the first reading unit 110.

Accordingly, in the solid-state imaging device 10 of the first embodiment, the second reading unit 120 reads each reduced pixel signal S2 ahead and determines a bit reduction method to the digital value of each total pixel signal S1, and then, the first reading unit 110 reduces the number of bits of each digital value obtained by performing analog-to-digital conversion on each total pixel signal S1 according to the bit reduction control signal and outputs each digital value to the transfer unit 130.

Figure 3:
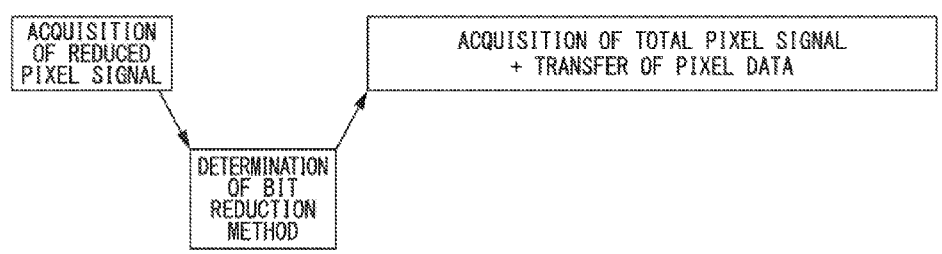
FIG. 3 is a diagram showing a read sequence of pixel signals in the solid-state imaging device of the first embodiment.

In the solid-state imaging device 10 of the first embodiment, the timing for reading the total pixel signal S1 and the reduced pixel signal S2 from the first charge storage circuit 103 and the second charge storage circuit 104 in the pixel signal processing unit 100 will be described. FIG. 3 is a diagram showing a read sequence of the pixel signals (the total pixel signal S1 and the reduced pixel signal S2) in the solid-state imaging device 10 of the first embodiment.

In the solid-state imaging device 10, for outputting pixel data according to each total pixel signal S1 with the reduced number of bits, first, the second reading control unit 1201 in the second reading unit 120 sequentially outputs the reading control signal for sequentially reading each reduced pixel signal S2 to each of the second charge storage circuit 104*ab* and the second charge storage circuit 104*cd* in the pixel signal processing unit 100. With this, each reduced pixel signal S2 is sequentially output from each of the second charge storage circuit 104*ab* and the second charge storage circuit 104*cd* and is sequentially input to the second A/D conversion unit 1202. The second A/D conversion unit 1202 sequentially outputs the digital value of each reduced pixel signal S2 obtained by performing analog-to-digital conversion on each reduced pixel signal S2 (analog signal) sequentially input to the bit reduction method determination unit 1205.

The bit reduction method determination unit 1205 determines the bit reduction method, in which the bit reduction unit 1103 in the first reading unit 110 reduces the number of bits of the digital value of each total pixel signal S1, based on the digital value of each reduced pixel signal S2 sequentially input from the second A/D conversion unit 1202. The bit reduction method determination unit 1205 outputs the bit reduction control signal representing the determined bit reduction method to the bit reduction unit 1103 in the first reading unit 110.

The first reading control unit 1101 in the first reading unit 110 sequentially outputs the reading control signal for sequentially reading each total pixel signal S1 to each of the first charge storage circuit 103*a* to the first charge storage circuit 103*d* in the pixel signal processing unit 100. With this, each total pixel signal S1 is sequentially output from each of the first charge storage circuit 103*a* to the first charge storage circuit 103*d* and is sequentially input to the first A/D conversion unit 1102. The first A/D) conversion unit 1102 sequentially outputs the digital value of each total pixel signal S1 obtained by performing analog-to-digital conversion on each total pixel signal S1 (analog signal) sequentially input to the bit reduction unit 1103.

The bit reduction unit 1103 sequentially reduces the number of bits of the digital value of each total pixel signal S1 sequentially input from the first A/D conversion unit 1102 according to the bit reduction control signal input from the bit reduction method determination unit 1205 and sequentially outputs the digital value of each total pixel signal S1 with the reduced number of bits to the transfer unit 130. With this, the transfer unit 130 sequentially transfers (outputs) the digital value of each total pixel signal S1 with the reduced number of bits input from the bit reduction unit 1103 as pixel data with the reduced number of bits to the outside.

Since the reduced pixel signal S2 is a pixel signal with the number of pixels disposed in the pixel array reduced, for example, even in a case where the reading of the total pixel signal S1 and the reduced pixel signal S2 is started simultaneously, the reduced pixel signal S2 with the reduced number of pixels can be read more quickly than the total pixel signal S1 with the unreduced number of pixels. With this, the bit reduction method determination unit 1205 can quickly determine the bit reduction method for reducing the number of bits of the digital value of each total pixel signal S1. With this, in the solid-state imaging device 10 of the first embodiment shown in FIG. 2, it is possible to sequentially transfer (output) the digital value (pixel data) of the total pixel signal S1 with the reduced number of bits from the transfer unit 130 to the outside while performing the reading of the total pixel signal S1 in the first reading unit 110 and the reduction of the number of bits of the digital value of the total pixel signal S1 in real time.

A method of reducing the number of bits of the digital value of the total pixel signal S1 in the solid-state imaging device 10 of the first embodiment will be described. In the solid-state imaging device 10 of the first embodiment shown in FIG. 2, it is possible to examine the states of the total pixel signal S1 output from the solid-state imaging device 10, for example, the dynamic range, the brightness distribution, or the like based on the read reduced pixel signal S2 using the fact that the reduced pixel signal S2 can be read quickly.

(First Bit Reduction Method)

Figure 4A:
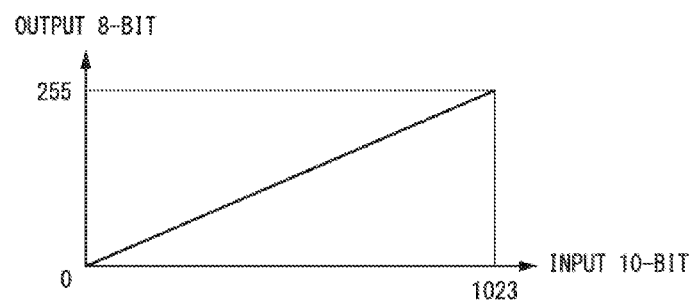
FIGS. 4A and 4B are diagrams illustrating a first bit reduction method in the solid-state imaging device of the first embodiment.
Figure 4B:
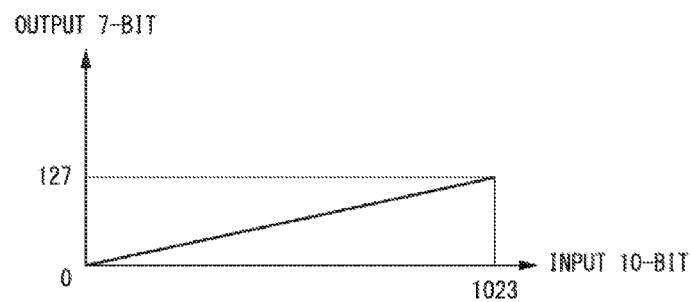

FIGS. 4A and 4B are diagrams illustrating a first bit reduction method in the solid-state imaging device 10 of the first embodiment. The first bit reduction method is a method which examines the entire dynamic range of the total pixel signal S1 based on the digital value of each reduced pixel signal S2 read ahead and determines the number of bits allocated to the digital value of the total pixel signal S1, that is, the number of bits to be reduced. The dynamic range can be examined by calculating the difference between a maximum value and a minimum value of the digital value of the reduced pixel signal S2. In the following description, it is assumed that the first A/D conversion unit 1102 performs analog-to-digital conversion of the input total pixel signal S1 (analog signal) to a 10-bit digital value.

In the first bit reduction method, the bit reduction method determination unit 1205 examines the dynamic range of the digital value of each reduced pixel signal S2 sequentially input from the second A/D) conversion unit 1202. With this, the bit reduction method determination unit 1205 can examine the entire dynamic range of the total pixel signal S1. The bit reduction method determination unit 1205 determines the number of bits allocated to the digital value of each total pixel signal S1 such that the number of bits is increased in a case where the examined entire dynamic range of the total pixel signal S1 is wide and the number of bits is decreased in a case where the dynamic range is narrow.

The bit reduction method determination unit 1205 outputs the bit reduction control signal representing the determined number of bits allocated to the digital value of each total pixel signal S1 to the bit reduction unit 1103. With this, the bit reduction unit 1103 reduces the number of bits of the digital value of each total pixel signal S1 input from the first A/D conversion unit 1102 according to the input bit reduction control signal and outputs the digital value to the transfer unit 130.

FIG. 4A shows a reduction example of the number of bits of the digital value in a case where the examined entire dynamic range of the total pixel signal S1 is wide. FIG. 4B shows a reduction example of the number of bits of the digital value in a case where the examined entire dynamic range of the total pixel signal S1 is narrow.

Specifically, in a case where the examined entire dynamic range of the total pixel signal S1 is wide, the bit reduction method determination unit 1205 determines to allocate a large number of bits to the digital value of the total pixel signal S1. The bit reduction method determination unit 1205 outputs the bit reduction control signal representing reduction of the digital value of the total pixel signal S1 subjected to analog-to-digital conversion and output from the first A/D conversion unit 1102 from 10 bits to 8 bits to the bit reduction unit 1103. With this, for example, as shown in FIG. 4A, the bit reduction unit 1103 divides the 10-bit digital value of the input total pixel signal S1 by 4 to output an 8-bit digital value of the total pixel signal S1 with lower-order 2 bits reduced.

In a case where the examined entire dynamic range of the total pixel signal S1 is narrow, the bit reduction method determination unit 1205 determines to decrease the number of bits allocated to the digital value of the total pixel signal S1. The bit reduction method determination unit 1205 outputs the bit reduction control signal representing reduction of the digital value of the total pixel signal S1 subjected to analog-to-digital conversion and output from the first A/D conversion unit 1102 from 10 bits to 7 bits to the bit reduction unit 1103. With this, for example, as shown in FIG. 4B, the bit reduction unit 1103 divides the 10-bit digital value of the input total pixel signal S1 by 8 to output a 7-bit digital value of the total pixel signal S1 with lower-order 3 bits reduced.

In this way, in the first bit reduction method, the reduced pixel signal S2 is read ahead, and accordingly, the entire dynamic range of the total pixel signal S1 is examined before the digital value of the total pixel signal S1 with the same exposure is output as pixel data. With this, in the first bit reduction method, in a case where the examined entire dynamic range of the total pixel signal S1 is narrow, the number of bits allocated to the digital value is decreased to reduce the number of bits of pixel data of the total pixel signal S1 transferred (output) to the outside, whereby it is possible to reduce the power consumption of the solid-state imaging device 10 of the first embodiment. In the first bit reduction method, in a case where the examined entire dynamic range of the total pixel signal S1 is wide, the number of bits allocated to the digital value is increased to decrease the reduction amount of the number of bits of pixel data of the total pixel signal S1 transferred (output) to the outside, whereby it is possible to suppress deterioration of an image generated based on pixel data output from the solid-state imaging device 10 of the first embodiment.

In this way, in the solid-state imaging device 10 of the first embodiment, it is possible to control the number of bits of output pixel data according to the entire dynamic range of the total pixel signal S1 examined in advance by the first bit reduction method, and even in a case where the number of bits of output pixel data is reduced, it is possible to achieve both of reduction in the power consumption of the solid-state imaging device 10 of the first embodiment and suppression of image quality deterioration.

(Second Bit Reduction Method)

Figure 5A:
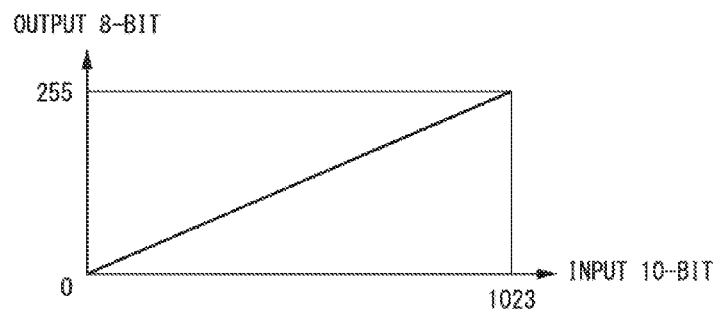
FIGS. 5A to 5C are diagrams illustrating a second bit reduction method in the solid-state imaging device of the first embodiment.
Figure 5B:
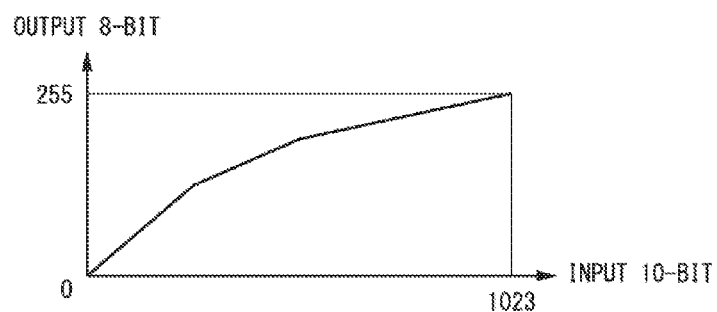
Figure 5C:
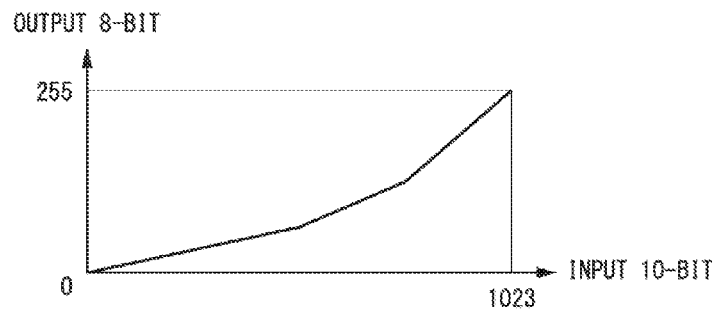

FIGS. 5A to 5C are diagrams illustrating a second bit reduction method in the solid-state imaging device 10 of the first embodiment. The second bit reduction method is a method which examines the entire brightness distribution of the total pixel signal S1 based on the digital value of each reduced pixel signal S2 read ahead and determines the range of the bits allocated to the digital value of the total pixel signal S1 to reduce the number of bits of the digital value of the total pixel signal S1. The brightness distribution can be examined by calculating a histogram of the digital value of the reduced pixel signal S2. In the following description, it is also assumed that the first A/D conversion unit 1102 performs analog-to-digital conversion of the input total pixel signal S1 (analog signal) to a 10-bit digital value.

In the second bit reduction method, the bit reduction method determination unit 1205 examines the brightness distribution of the reduced pixel signal S2 from the digital value of each reduced pixel signal S2 sequentially input from the second A/D conversion unit 1202. With this, the bit reduction method determination unit 1205 can examine the entire brightness distribution of the total pixel signal S1. The bit reduction method determination unit 1205 determines the range of the bits allocated to the digital value of the total pixel signal S1, that is, the gradation allocated to the digital value of the total pixel signal S1 based on the examined entire brightness distribution of the total pixel signal S1.

Specifically, in a case where the examined entire brightness distribution of the total pixel signal S1 includes a large number of dark portions, for example, in a case where a captured image is dark as a whole, the range of the bits allocated to the digital value of the total pixel signal S1 is determined such that a large number of bits are allocated by a digital value (a digital value having a small value) representing a dark value. Furthermore, in a case where the examined entire brightness distribution of the total pixel signal S1 includes a large number of bright portions, for example, in a case where a captured image is bright as a whole, the range of the bits allocated to the digital value of the total pixel signal S1 is determined such that a large number of bits are allocated by a digital value (a digital value having a large value) representing a bright value. In addition, in a case where the examined entire brightness distribution of the total pixel signal S1 has no large difference between the dark portions and the bright portions, for example, in a case where a captured image has uniform brightness as a whole, the range of the bits allocated to the digital value of the total pixel signal S1 is determined such that the number of bits is allocated to each digital value uniformly.

The bit reduction method determination unit 1205 outputs the bit reduction control signal representing the range of the bits allocated to the determined digital value to the bit reduction unit 1103. With this, the bit reduction unit 1103 reduces the number of bits of the digital value of each total pixel signal S1 input from the first A/D) conversion unit 1102 according to the input bit reduction control signal and outputs the digital value to the transfer unit 130.

FIGS. 5A to 5C show an example where the range of the bits allocated to the digital value of the total pixel signal S1 is changed according to the examined entire brightness distribution of the total pixel signal S1 in a case of reducing the number of bits of the digital value of the total pixel signal S1 subjected to analog-to-digital conversion and output from the first A/D conversion unit 1102 from 10 bits to 8 bits. FIG. 5A shows an example of the range of the bits of the digital value to be allocated in a case where the examined entire brightness distribution of the total pixel signal S1 represents uniform brightness as a whole. FIG. 5B shows an example of the range of the bits to be allocated in a case where the examined entire brightness distribution of the total pixel signal S1 represents dark as a whole. FIG. 5C shows an example of the range of the bits of the digital value to be allocated in a case where the examined entire brightness distribution of the total pixel signal S1 represents bright as a whole.

Specifically, in a case where the examined entire brightness distribution of the total pixel signal S1 represents uniform brightness as a whole, the bit reduction method determination unit 1205 determines to allocate the range of the bits to the digital value of each total pixel signal S1 uniformly. The bit reduction method determination unit 1205 outputs the bit reduction control signal representing reduction of the digital value of the total pixel signal S1 subjected to analog-to-digital conversion and output from the first A/D conversion unit 1102 from 10 bits to 8 bits to the bit reduction unit 1103. With this, for example, as shown in FIG. 5A, the bit reduction unit 1103 divides the 10-bit digital value of the input total pixel signal S1 by 4 to output the 8-bit digital value of total pixel signal S1 the with lower-order 2 bits reduced.

In a case where the examined entire brightness distribution of the total pixel signal S1 represents dark as a whole, the bit reduction method determination unit 1205 determines to allocate the range of a larger number of bits to the digital value of the total pixel signal S1 representing a dark value and to reduce the range of a small number of bits to the digital value of the total pixel signal S1 representing a bright value to reduce the number of bits. With this, it is possible to reduce the number of bits of the digital value by lowering the bit accuracy of a digital value (a digital value having a large value) representing a bright value without lowering the bit accuracy of a digital value (a digital value having a small value) representing a dark value, and to reduce an error of the gradation of a dark portion in a captured image. The bit reduction method determination unit 1205 outputs the bit reduction control signal representing reduction of the number of bits to an 8-bit digital value having a different value according to the 10-bit digital value of the total pixel signal S1 subjected to analog-to-digital conversion and output from the first A/D conversion unit 1102 by the determined reduction method of the number of bits to the bit reduction unit 1103. With this, for example, as shown in FIG. 5B, the bit reduction unit 1103 outputs the 8-bit digital value of the total pixel signal S1 with lower-order 1 bit to 4 bits reduced according to the 10-bit digital value of the input total pixel signal S1.

In a case where the examined entire brightness distribution of the total pixel signal S1 represents bright as a whole, the bit reduction method determination unit 1205 determines to allocate the range of a larger number of bits to the digital value of the total pixel signal S1 representing a bright value and to reduce the range of a small number of bits to the digital value of the total pixel signal S1 representing a dark value to reduce the number of bits. With this, it is possible to reduce the number of bits of the digital value by lowering the bit accuracy of a digital value (a digital value having a small value) representing a dark value without lowering the bit accuracy of a digital value (a digital value having a large value) representing a bright value, and to reduce an error of the gradation of a bright portion in a captured image. The bit reduction method determination unit 1205 outputs the bit reduction control signal representing reduction of the number of bits to an 8-bit digital value having a different value according to the 10-bit digital value of the total pixel signal S1 subjected to analog-to-digital conversion and output from the first A/D conversion unit 1102 by the determined reduction method of the number of bits to the bit reduction unit 1103. With this, for example, as shown in FIG. 5C, the bit reduction unit 1103 outputs the 8-bit digital value of the total pixel signal S1 with lower-order 1 bit or 4 bits reduced according to the 10-bit digital value of the input total pixel signal S1.

In this way, in the second bit reduction method, the reduced pixel signal S2 is read ahead, and accordingly, the entire brightness distribution of the total pixel signal S1 is examined before the digital value of the total pixel signal S1 with the same exposure is output as pixel data. With this, in the second bit reduction method, the range of the bits allocated to the digital value is controlled according to the examined entire brightness distribution of the total pixel signal S1, whereby it is possible to reduce the number of bits of pixel data of the total pixel signal S1 transferred (output) to the outside, and to reduce the power consumption of the solid-state imaging device 10 of the first embodiment. In the second bit reduction method, since the range of the bits allocated to the digital value is controlled according to the examined entire brightness distribution of the total pixel signal S1, it is possible to suppress deterioration of an image generated based on pixel data output from the solid-state imaging device 10 of the first embodiment.

In this way, in the second bit reduction method in the solid-state imaging device of the first embodiment, it is possible to control the number of bits of output pixel data according to the entire brightness distribution of the total pixel signal S1 examined in advance, and even in a case where the number of bits of output pixel data is reduced, as in the first bit reduction method, it is possible to achieve both of reduction of the power consumption of the solid-state imaging device 10 of the first embodiment and suppression of image quality deterioration.

According to the first embodiment, the solid-state imaging device (solid-state imaging device 10) includes the pixel signal processing unit (pixel signal processing unit 100) which has a plurality of pixels disposed in a two-dimensional matrix, outputs each of the pixel signals generated by all of a plurality of pixels disposed therein as the total pixel signal (total pixel signal S1), and outputs each of the pixel signals generated by a plurality of pixels as the reduced pixel signal (reduced pixel signal S2) with the number of pixels reduce to a prescribed number of pixels, the bit reduction method determination unit (bit reduction method determination unit 1205) which determines the bit reduction method for reducing the number of bits of the digital value representing the amount of the total pixel signal S1 based on the reduced pixel signal S2, and the bit reduction unit (bit reduction unit 1103) which reduces the number of bits of the digital value (the digital value of the total pixel signal S1) based on the bit reduction method determined by the bit reduction method determination unit 1205 and outputs the digital value with the reduced number of bits as the digital value (pixel data) corresponding to the total pixel signal S1.

According to the first embodiment, in the solid-state imaging device 10, the reduced pixel signal S2 is a pixel signal obtained by averaging the pixel signals generated by a plurality of corresponding pixels among the plurality of pixels in the same exposure period.

According to the first embodiment, in the solid-state imaging device 10, the reduced pixel signal S2 may be a pixel signal generated by one prescribed pixel among the pixel signals generated by a plurality of corresponding pixels among the plurality of pixels in the same exposure period.

According to the first embodiment, in the solid-state imaging device 10, the bit reduction method determination unit 1205 examines the entire dynamic range of the total pixel signal S1 based on the reduced pixel signal S2 and determines the number of bits allocated to the digital value (pixel data) corresponding to the total pixel signal S1 according to the level of the examined dynamic range.

According to the first embodiment, in the solid-state imaging device 10, the bit reduction method determination unit 1205 examines the entire brightness distribution of the total pixel signal S1 based on the reduced pixel signal S2 and determines the range of bits allocated to the digital value (pixel data) corresponding to the total pixel signal S1 based on the examined brightness distribution.

According to the first embodiment, the imaging system (imaging system 1) includes the solid-state imaging device (solid-state imaging device 10). The bit reduction method determination unit 1205 determines the bit reduction method based on information representing conditions for performing imaging with the solid-state imaging device 10 in addition to the reduced pixel signal S2.

As described above, in the solid-state imaging device 10 of the first embodiment, the total pixel signal S1 which is each of the pixel signals of all pixels provided in the pixel signal processing unit 100 and the reduced pixel signal S2 which is each of the pixel signals with the number of pixels provided in the pixel signal processing unit 100 reduced are separately output from the pixel signal processing unit 100 based on the signal charge obtained by the same single exposure. In the solid-state imaging device 10 of the first embodiment, the feature of a captured image is examined based on the reduced pixel signal S2 output from the pixel signal processing unit 100. In the solid-state imaging device 10 of the first embodiment, the method of reducing the number of bits of the digital value of the total pixel signal S1 is controlled based on the examined feature of the image. In a conventional solid-state imaging device including a mechanism for changing the number of bits of pixel data, since the number of bits of pixel data is reduced according to the operation mode of an imaging system with the conventional solid-state imaging device mounted therein to reduce power consumption, if the number of bits of pixel data is reduced, image quality is inevitably deteriorated. In contrast, in the solid-state imaging device 10 of the first embodiment, since the number of bits of output pixel data is controlled to a proper number of bits based on the feature of the image examined in advance, even in a case where the number of bits of output pixel data is reduced, it is possible to achieve both of reduction of the power consumption of the solid-state imaging device 10 of the first embodiment and suppression of image quality deterioration.

In the solid-state imaging device 10 of the first embodiment, in order to reduce the number of bits of the digital value of the total pixel signal S1, the dynamic range or the brightness distribution is examined using the reduced pixel signal S2 output from the pixel signal processing unit 100. The examination of the dynamic range or the brightness distribution may be performed, for example, using the total pixel signal S1 output from the pixel signal processing unit 100. However, since the total pixel signal S1 is the pixel signal with the unreduced number of pixels, a lot of time is required for the examination of the dynamic range or the brightness distribution. For this reason, as in the solid-state imaging device 10 of the first embodiment, it is advantageous to examine the dynamic range or the brightness distribution using the reduced pixel signal S2 with the reduced number of pixels since it is possible to reduce the time required for the examination.

In the solid-state imaging device 10 of the first embodiment, as the method of reducing the number of bits of the digital value of the total pixel signal S1, the first bit reduction method which examines the dynamic range to control the number of bits to be reduced and the second bit reduction method which examines the brightness distribution to control the range of the bits allocated to the digital value are described. However, each of the bit reduction methods described above is not applied to the solid-state imaging device 10 of the first embodiment alone, the bit reduction methods which reduces the number of bits of the digital value may be applied simultaneously to the solid-state imaging device 10 of the first embodiment.

The method which reduces the number of bits of the digital value of the total pixel signal S1 in the solid-state imaging device 10 of the first embodiment is not limited to the methods described above, and the number of bits of the digital value to be reduced can also be controlled based on other features of a captured image which can be examined based on the reduced pixel signal S2 read ahead from the pixel signal processing unit 100. For example, the entire contrast value (the amount of edge component) of the total pixel signal S1 may be examined based on the digital value of each reduced pixel signal S2 read ahead, and the number of bits allocated to the digital value of the total pixel signal S1 may be determined. In this case, the bit reduction method determination unit 1205 determines the number of bits allocated to the digital value of each total pixel signal S1 such that the number of bits is increased in a case where the examined entire contrast value of the total pixel signal S1 is high and the number of bits is decreased in a case where the contrast value is low. The contrast value can be examined by performing filtering to the digital value of the reduced pixel signal S2.

According to the first embodiment, in the solid-state imaging device 10, the bit reduction method determination unit 1205 examines the entire contrast value of the total pixel signal S1 based on the reduced pixel signal S2 and determines the number of bits allocated to the digital value (pixel data) corresponding to the total pixel signal S1 according to the level of the examined contrast value.

As information for determining the method of reducing the number of bits of the digital value of the total pixel signal S1 in the solid-state imaging device 10 of the first embodiment, conditions for performing imaging in the imaging system 1 with the solid-state imaging device 10 mounted therein may be included in addition to the digital value of the reduced pixel signal S2 read ahead. For example, when the imaging system 1 with the solid-state imaging device 10 mounted therein performs an imaging operation, control information (for example, aperture information or focusing information) of a lens (not shown) which is controlled by the CPU 260 of the image processing unit 20 provided in the imaging system 1 may be used. For example, in a case of using the aperture information, when the aperture of the lens (not shown) is opened, it is considered that a captured image has a comparatively low contrast value; thus, it is possible to control the number of bits of the digital value such that the number of bits allocated to the digital value of the total pixel signal S1 is further decreased. For example, in a case of using the focusing information, the number of bits allocated to the digital value of the total pixel signal S1 can be controlled such that the number of bits is increased when the lens (not shown) is focused and the number of bits is decreased when the lens (not shown) is not focused. The method which controls the number of bits allocated to the digital value of the total pixel signal S1 while including the aperture information or the focusing information can be applied without depending on a system of auto focus in the imaging system 1 with the solid-state imaging device 10 mounted thereon. As the aperture information or the focusing information, an evaluation value for controlling auto exposure or auto focus generated by the evaluation value generation unit 211 provided in the imaging system 1 with the solid-state imaging device 10 mounted therein may be used.

According to the first embodiment, in the imaging system 1, information representing the conditions for performing imaging is control information of a lens including at least one of the aperture information and the focusing information of a lens which forms an optical image of an object on the solid-state imaging device 10.

In regard to the bit reduction method determined in the solid-state imaging device 10 of the first embodiment, the same bit reduction method may be applied to all captured images, or a different bit reduction method may be applied to each reduced pixel signal S2, that is, each range (region) of a prescribed set of pixels in which the number of pixels provided in the pixel signal processing unit 100 of the solid-state imaging device 10 is reduced.

In the solid-state imaging device 10 of the first embodiment, the digital value of the reduced pixel signal S2 is not transferred to the outside as pixel data. However, as described above, in the imaging system 1 of this embodiment shown in FIG. 1, for example, a live view image (through image) for confirming an object to be imaged may be displayed on the display processing unit 230. For this reason, if the digital value of the reduced pixel signal S2 can be output as pixel data, for example, it is possible to effectively use the digital value for displaying the live view image on the display processing unit 230.

Second Embodiment

Figure 6:
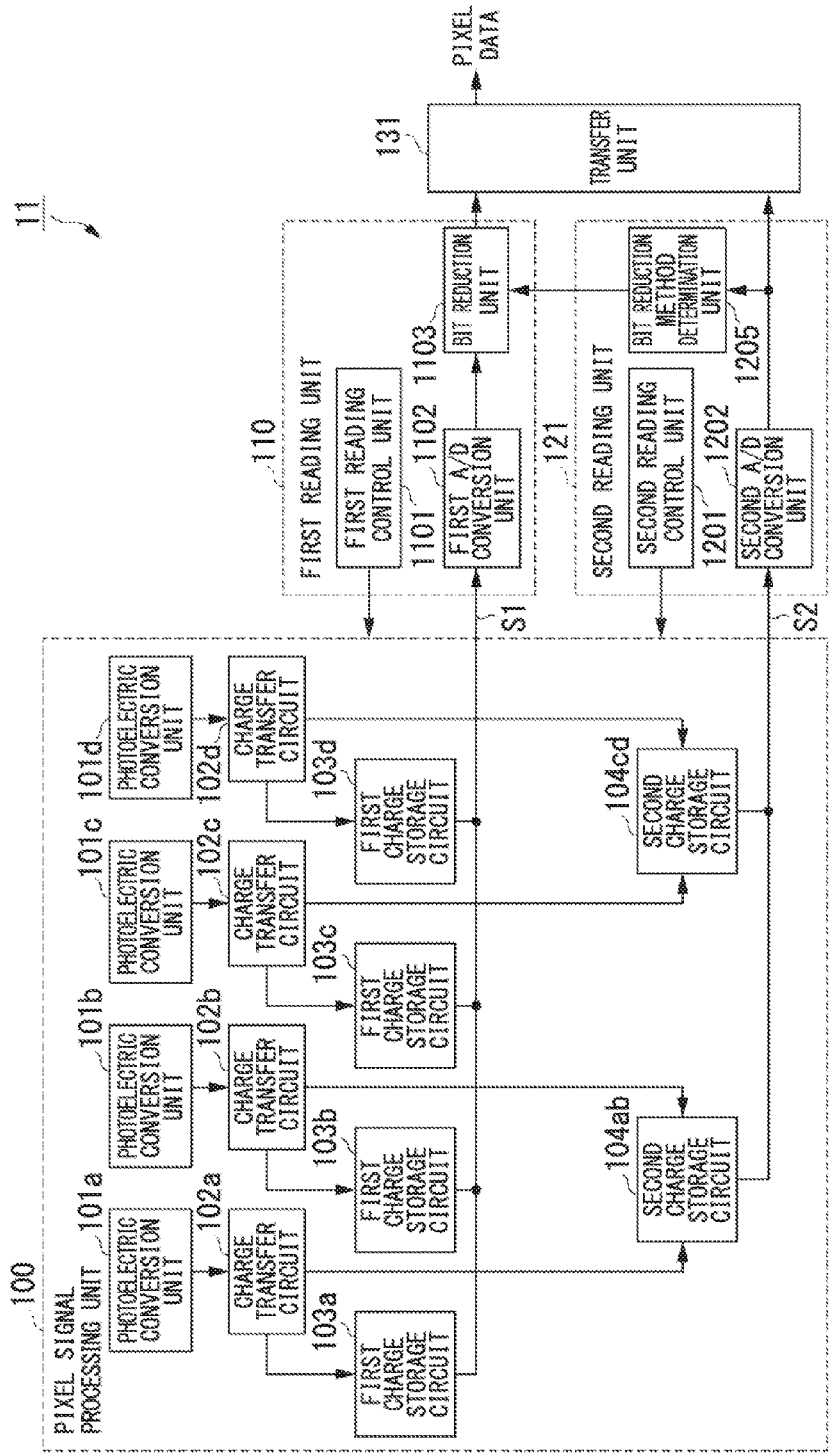
FIG. 6 is a block diagram showing the schematic configuration of a solid-state imaging device in a second embodiment of the invention.

Next, a solid-state imaging device of a second embodiment mounted in the imaging system 1 of this embodiment will be described. FIG. 6 is a block diagram showing the schematic configuration of the solid-state imaging device in the second embodiment. A solid-state imaging device 11 shown in FIG. 6 has a pixel signal processing unit 100, a first reading unit 110, a second reading unit 121, and a transfer unit 131. The components of the solid-state imaging device 11 of the second embodiment include the same components as the components of the solid-state imaging device 10 of the first embodiment. Accordingly, among the components of the solid-state imaging device 11 of the second embodiment, the same components as the components of the solid-state imaging device 10 of the first embodiment are represented by the same reference numerals, and detailed description of the components will not be repeated.

The pixel signal processing unit 100 outputs each total pixel signal S1 to the first reading unit 110 according to the reading control signal input from the first reading unit 110. The pixel signal processing unit 100 outputs each reduced pixel signal S2 to the second reading unit 121 according to the reading control signal input from the second reading unit 121. The first reading unit 110 outputs the digital value of each total pixel signal S1 with the reduced number of bits to the transfer unit 131.

Similarly to the second reading unit 120 provided in the solid-state imaging device 10 of the first embodiment, the second reading unit 121 reads each reduced pixel signal S2 from the pixel signal processing unit 100. The second reading unit 121 determines the method of reducing the number of bits of the digital value of the total pixel signal S1 in the first reading unit 110 based on each read reduced pixel signal S2 and outputs the bit reduction control signal representing the determined bit reduction method to the first reading unit 110. The second reading unit 121 outputs each digital value obtained by performing analog-to-digital conversion on each reduced pixel signal S2 read from the pixel signal processing unit 100 to the transfer unit 131 as it is, that is, without reducing the number of bits of the digital value of each reduced pixel signal S2. The second reading unit 121 has the same configuration as the second reading unit 120 provided in the solid-state imaging device 10 of the first embodiment except that the digital value of the reduced pixel signal S2 is output to the transfer unit 131, and thus, detailed description thereof will not be repeated.

The transfer unit 131 transfers the digital value (hereinafter, referred to as "total pixel data") of each total pixel signal S1 with the reduced number of bits output from the first reading unit 110 and the digital value (hereinafter, referred to as "reduced pixel data") of each reduced pixel signal S2 with the unreduced number of bits output from the second reading unit 121 to the outside as pixel data. That is, the transfer unit 131 transfers (outputs) total pixel data with the reduced number of bits and reduced pixel data with the unreduced number of bits to the imaging processing unit 210 in the image processing unit 20.

A sequence for the transfer unit 131 transferring (outputting) total pixel data and reduced pixel data to the imaging processing unit 210 in the image processing unit 20 as pixel data is not particularly specified. However, since reduced pixel data with the unreduced number of bits, that is, the digital value of the reduced pixel signal S2 has the reduced number of pixels, reduced pixel data can be output more quickly than total pixel data with the unreduced number of pixels. For this reason, it is advantageous to output reduced pixel data as pixel data ahead, for example, for performing processing requiring real time performance in the image processing unit 20, such as the generation of the live view image, the generation of the evaluation value by the evaluation value generation unit 211, and recognition of the object by the image recognition unit 250.

With this configuration, the solid-state imaging device 11 reduces the number of bits of each piece of total pixel data based on the pixel signals of all pixels provided in the pixel signal processing unit 100, outputs total pixel data to the imaging processing unit 210 in the image processing unit 20, and outputs each reduced pixel data based on the pixel signals with the number of pixels provided in the pixel signal processing unit 100 reduced to the imaging processing unit 210 in the image processing unit 20. With this, in the image processing unit 20 mounted in the imaging system 1 of this embodiment, it is possible to properly use reduced pixel data for use in processing requiring real time performance and total pixel data for use in processing requiring image quality according to the processing.

In the solid-state imaging device 11 of the second embodiment, the timing for reading each of the total pixel signal S1 and the reduced pixel signal S2 from the pixel signal processing unit 100 is the same as the reading sequence of the total pixel signal S1 and the reduced pixel signal S2 in the solid-state imaging device 10 of the first embodiment shown in FIG. 3, and thus, detailed description thereof will not be repeated. However, in the reading sequence of the pixel signal in the solid-state imaging device 11 of the second embodiment, the second A/I) conversion unit 1202 in the second reading unit 121 sequentially outputs the digital value (reduced pixel data) of the reduced pixel signal S2 obtained by performing analog-to-digital conversion on each reduced pixel signal S2 (analog signal) sequentially input to the bit reduction method determination unit 1205 and sequentially outputs reduced pixel data to the transfer unit 131.

The reduction method of the number of bits of total pixel data in the solid-state imaging device 11 of the second embodiment is the same as the first bit reduction method and the second bit reduction method in the solid-state imaging device 10 of the first embodiment shown in FIGS. 4A to 5C, and thus, detailed description thereof will not be repeated.

As described above, in the solid-state imaging device 11 of the second embodiment, similarly to the solid-state imaging device 10 of the first embodiment, the number of bits of output total pixel data is controlled to a proper number of bits based on the feature of the image examined in advance. In the solid-state imaging device 11 of the second embodiment, the method of reducing the number of bits of total pixel data is the same as that of the solid-state imaging device 10 of the first embodiment. For this reason, in the solid-state imaging device 11 of the second embodiment, similarly to the solid-state imaging device 10 of the first embodiment, even in a case where the number of bits of output total pixel data is reduced, it is possible to achieve both of reduction of the power consumption of the solid-state imaging device 11 of the second embodiment and suppression of image quality deterioration.

In the solid-state imaging device 11 of the second embodiment, total pixel data according to the total pixel signal S1 as each of the pixel signals of all pixels in the pixel signal processing unit 100 and reduced pixel data according to the reduced pixel signal S2 as each of the pixel signals with the number of pixels provided in the pixel signal processing unit 100 reduced based on the signal charges obtained with the same single exposure can be transferred (output) from the pixel signal processing unit 100. With this, in the imaging system 1 with the solid-state imaging device 11 of the second embodiment mounted therein, it is possible to achieve both of securing of image quality and securing real time performance.

Third Embodiment

Figure 7:
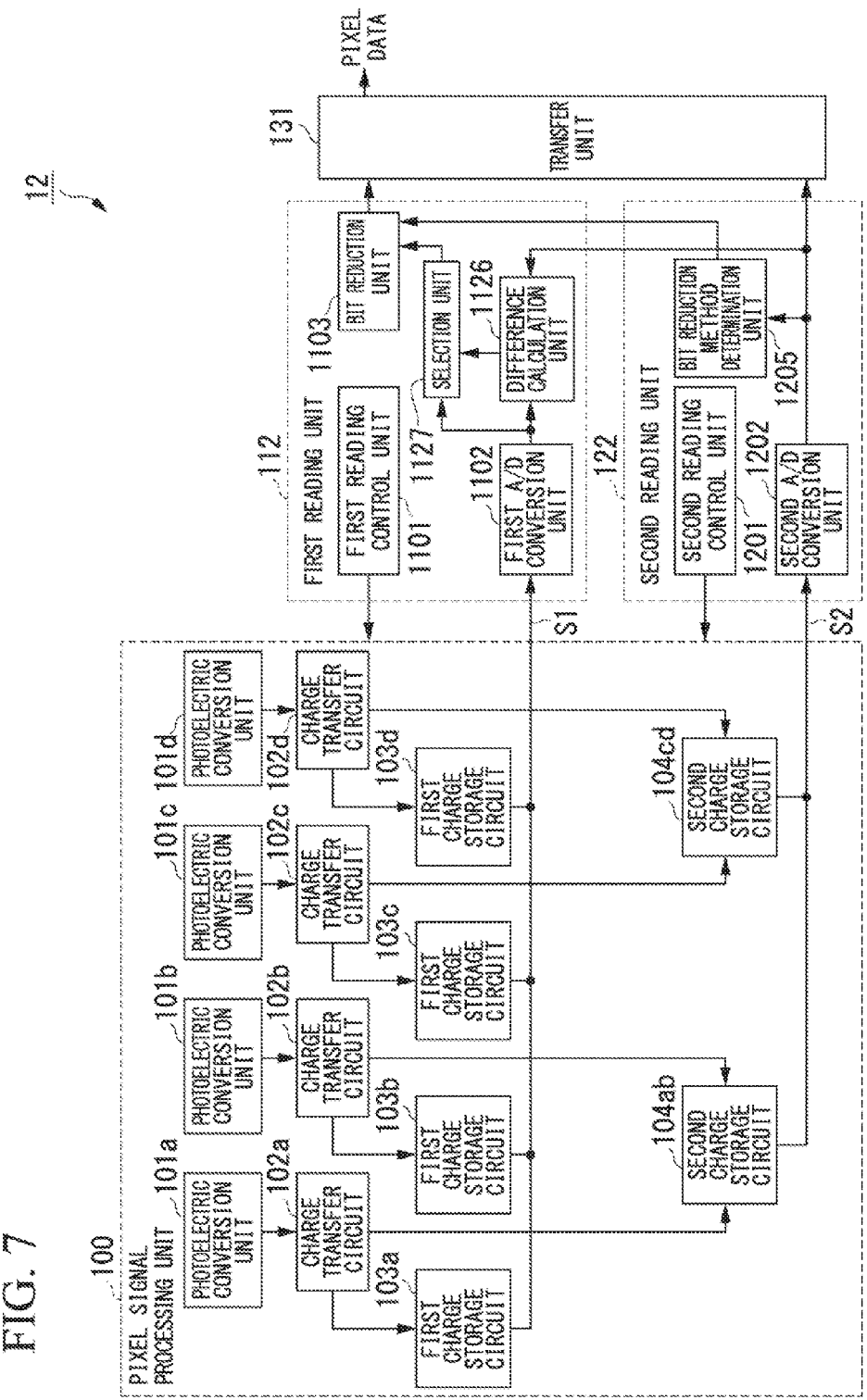
FIG. 7 is a block diagram showing the schematic configuration of a solid-state imaging device in a third embodiment of the invention.

Next, a solid-state imaging device of a third embodiment mounted in the imaging system 1 of this embodiment will be described. FIG. 7 is a block diagram showing the schematic configuration of the solid-state imaging device in the third embodiment. A solid-state imaging device 12 shown in FIG. 7 has a pixel signal processing unit 100, a first reading unit 112, a second reading unit 122, and a transfer unit 131. The components of the solid-state imaging device 12 of the third embodiment include the same components as the components of the solid-state imaging device 10 of the first embodiment or the solid-state imaging device 11 of the second embodiment. Accordingly, among the components of the solid-state imaging device 12 of the third embodiment, the same components as the components of the solid-state imaging device 10 of the first embodiment or the solid-state imaging device 11 of the second embodiment are represented by the same reference numerals, and detailed description of the components will not be repeated.

The pixel signal processing unit 100 outputs each total pixel signal S1 to the first reading unit 112 according to the reading control signal input from the first reading unit 112. The pixel signal processing unit 100 outputs each reduced pixel signal S2 to the second reading unit 122 according to the reading control signal input from the second reading unit 122.

Similarly to the first reading unit 110 provided in the solid-state imaging device 10 of the first embodiment and the solid-state imaging device 11 of the second embodiment, the first reading unit 112 outputs the digital value (total pixel data) of each total pixel signal S1 with the number of bits reduced according to the bit reduction control signal input from the second reading unit 122 to the transfer unit 131. The first reading unit 112 can output each digital value obtained by reducing the number of bits of the digital value of the difference between the digital value obtained by performing analog-to-digital conversion on the total pixel signal S1 read from the pixel signal processing unit 100 and the digital value (reduced pixel data) of the reduced pixel signal S2 subjected to analog-to-digital conversion in the second reading unit 122 to the transfer unit 131. Detailed description of the first reading unit 112 will be provided below.

Similarly to the second reading unit 121 provided in the solid-state imaging device 11 of the second embodiment, the second reading unit 122 reads each reduced pixel signal S2 from the pixel signal processing unit 100. The second reading unit 122 determines the method of reducing the number of bits of total pixel data according to the total pixel signal S1 output from the first reading unit 112 based on each read reduced pixel signal S2 and outputs the bit reduction control signal representing the bit reduction method to the first reading unit 110. The second reading unit 122 outputs reduced pixel data obtained by performing analog-to-digital conversion on each reduced pixel signal S2 read from the pixel signal processing unit 100 to the transfer unit 131 as it is, that is, without reducing the number of bits of reduced pixel data of the reduced pixel signal S2. The second reading unit 122 outputs each piece of reduced pixel data to the first reading unit 112. The second reading unit 122 is the same as the second reading unit 121 provided in the solid-state imaging device 11 of the second embodiment excluding a configuration in which each piece of reduced pixel data is output to the first reading unit 112, and thus, detailed description thereof will not be repeated.

The transfer unit 131 transfers (outputs) each piece of total pixel data with the reduced number of bits output from the first reading unit 112 and each piece of reduced pixel data with the unreduced number of bits output from the second reading unit 122 as pixel data to the outside (the imaging processing unit 210 in the image processing unit 20).

With this configuration, the solid-state imaging device 12 reduces the number of bits of each piece of total pixel data based on the pixel signals of all pixels provided in the pixel signal processing unit 100, outputs total pixel data to the imaging processing unit 210 in the image processing unit 20, and outputs each piece of reduced pixel data based on the pixel signals with the number of pixels provided in the pixel signal processing unit 100 reduced as pixel data to the imaging processing unit 210 in the image processing unit 20.

Next, the configuration of the first reading unit 112 provided in the solid-state imaging device 12 of the third embodiment will be described in more detail. The first reading unit 112 of the solid-state imaging device 12 of the third embodiment shown in FIG. 7 has a first reading control unit 1101, a first A/D conversion unit 1102, a bit reduction unit 1103, a difference calculation unit 1126, and a selection unit 1127. The components of the first reading unit 112 include the same components as the components of the first reading unit 110 provided in the solid-state imaging device 10 of the first embodiment and the solid-state imaging device 11 of the second embodiment. Accordingly, among the components of the first reading unit 112, the same components as the components of the first reading unit 110 are represented by the same reference numerals, and detailed description of the components will not be repeated.

The first A/D conversion unit 1102 performs analog-to-digital conversion on each total pixel signal S1 (analog signal) read by the first reading control unit 1101 and sequentially outputs the digital value representing the amount of each total pixel signal S1 (analog signal) to the difference calculation unit 1126 and the selection unit 1127.

The difference calculation unit 1126 calculates the difference between the digital value of each total pixel signal S1 sequentially input from the first A/D conversion unit 1102 and the digital value of each reduced pixel signal S2 sequentially input from the second reading unit 122 and sequentially outputs each digital value of the difference to the selection unit 1127. That is, the difference calculation unit 1126 outputs each digital value of the difference between the total pixel signal S1 and the reduced pixel signal S2 to the selection unit 1127.

Since the digital value output from the difference calculation unit 1126 is the digital value of the difference between the total pixel signal S1 and the reduced pixel signal S2, there are both cases including a case where the digital value is positive and a case where the digital value is negative. For this reason, the difference calculation unit 1126 applies a sign representing a positive digital value or a negative digital value to the output digital value and outputs the digital value to the selection unit 1127.

As described above, the reduced pixel signal S2 is the pixel signal obtained by reducing the number of pixels of the total pixel signal S1. For this reason, the digital value of the difference between the digital value of the total pixel signal S1 and the digital value of the reduced pixel signal S2 calculated by the difference calculation unit 1126 corresponds to a digital value with the edge component of the total pixel signal S1 extracted.

The selection unit 1127 selects one digital value of the digital value of the total pixel signal S1 sequentially input from the first A/D conversion unit 1102 and the digital value of the difference between the total pixel signal S1 and the reduced pixel signal S2 sequentially input from the difference calculation unit 1126. The selection unit 1127 sequentially outputs the selected digital value (hereinafter, referred to as "selected pixel data") to the bit reduction unit 1103.

A selection method of selected pixel data in the selection unit 1127 is not particularly specified. For example, the selection unit 1127 may select a digital value according to the operation mode of the solid-state imaging device 12 of the third embodiment set by the CPU 260 in the image processing unit 20 provided in the imaging system 1 of this embodiment with the solid-state imaging device 12 of the third embodiment mounted therein, or may select a digital value under the control of the bit reduction method determination unit 1205 controlled by the CPU 260.

The bit reduction unit 1103 reduces the number of bits of selected pixel data sequentially input from the selection unit 1127 according to the bit reduction control signal input from the bit reduction method determination unit 1205 in the second reading unit 122 by a prescribed method and outputs selected pixel data with the reduced number of bits as total pixel data to the transfer unit 131. Description of the method of reducing the number of bits of selected pixel data according to the bit reduction control signal in the bit reduction unit 1103 will be provided below.

With this configuration, the first reading unit 112 outputs one digital value (selected pixel data) of the digital value obtained by performing analog-to-digital conversion on each total pixel signal S1 read from the pixel signal processing unit 100 and the digital value of the difference between the digital value obtained by performing analog-to-digital conversion on the total pixel signal S1 read from the pixel signal processing unit 100 and the digital value of the reduced pixel signal S2 input from the second reading unit 122 to the transfer unit 130. At this time, similarly to the components of the first reading unit 110 of the solid-state imaging device 10 of the first embodiment and the solid-state imaging device 11 of the second embodiment, the first reading unit 112 reduces the number of bits of each piece of output selected pixel data according to the bit reduction control signal input from the second reading unit 122 and outputs selected pixel data to the transfer unit 131. With this, the transfer unit 131 outputs each digital value with the reduced number of bits based on the total pixel signal S1 input from the first reading unit 112 as total pixel data with the reduced number of bits to the outside.

In the solid-state imaging device 12 of the third embodiment, the timing for reading each of the total pixel signal S1 and the reduced pixel signal S2 from the pixel signal processing unit 100 is the same as the reading sequence of the total pixel signal S1 and the reduced pixel signal S2 in the solid-state imaging device 10 of the first embodiment and the solid-state imaging device 11 of the second embodiment shown in FIG. 3, and thus, detailed description thereof will not be repeated. However, in the reading sequence of the pixel signal in the solid-state imaging device 12 of the third embodiment, the second A/D conversion unit 1202 in the second reading unit 122 sequentially outputs the digital value (reduced pixel data) of the reduced pixel signal S2 obtained by performing analog-to-digital conversion on each reduced pixel signal S2 (analog signal) sequentially input to the bit reduction method determination unit 1205, and sequentially outputs reduced pixel data to the transfer unit 131 and the difference calculation unit 1126 in the first reading unit 112. Accordingly, in the solid-state imaging device 12 of the third embodiment, the second reading unit 122 reads each reduced pixel signal S2 ahead, the difference calculation unit 1126 in the first reading unit 112 calculates the difference, and then, the bit reduction unit 1103 reduces the number of bits of selected pixel data and outputs selected pixel data to the transfer unit 130.

Next, the reduction method of the number of bits of pixel data in the solid-state imaging device 12 of the third embodiment will be described. In the solid-state imaging device 12 of the third embodiment, similarly to the solid-state imaging device 10 of the first embodiment and the solid-state imaging device 11 of the second embodiment, for example, it is possible to examine the entire state of the total pixel signal S1 output from the solid-state imaging device 12, for example, the dynamic range, the brightness distribution, or the like using the fact that the reduced pixel signal S2 can be read quickly. Accordingly, the reduction method of the number of bits of pixel data in the solid-state imaging device 12 of the third embodiment can be considered similarly to the first bit reduction method and the second bit reduction method in the solid-state imaging device 10 of the first embodiment and the solid-state imaging device 11 of the second embodiment shown in FIGS. 4A to 5C.

However, in the solid-state imaging device 12 of the third embodiment, the difference calculation unit 1126 in the first reading unit 112 reduces the number of bits of the digital value of the difference between the total pixel signal S1 and the reduced pixel signal S2, that is, the digital value to which a sign representing a positive digital value or a negative digital value is applied. In the following description, the reduction method of the number of bits in a case where the digital value of the difference between the total pixel signal S1 and the reduced pixel signal S2 is selected as selected pixel data by the selection unit 1127 will be described. FIGS. 8A to 8D are diagrams illustrating a bit reduction method in the solid-state imaging device 12 of the third embodiment. In the following description, it is assumed that the number of bits of 11-bit selected pixel data having a 1-bit sign and a 10-bit value (integer) is reduced.

Figure 8A:
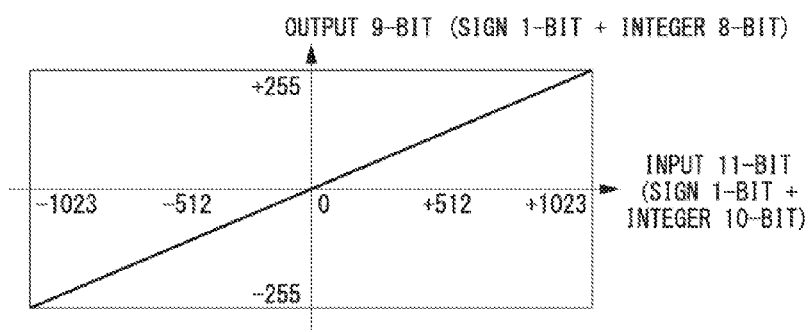
FIGS. 8A to 8D are diagrams illustrating a bit reduction method in the solid-state imaging device of the third embodiment.
Figure 8B:
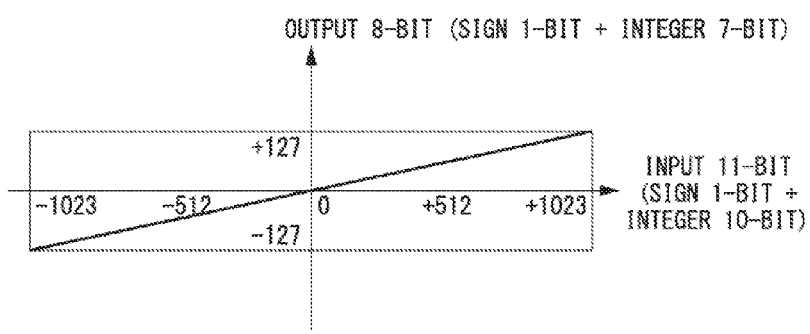

FIG. 8A shows a reduction example of the number of bits of selected pixel data in a case where the examined entire dynamic range of the total pixel signal S1 is wide. FIG. 8B shows a reduction example of the number of bits of selected pixel data in a case where the examined entire dynamic range of the total pixel signal S1 is narrow. That is, FIGS. 8A and 8B show a reduction example of the number of bits by the first bit reduction method.

Specifically, in a case where the examined entire dynamic range of the total pixel signal S1 is wide, the bit reduction method determination unit 1205 determines to allocate a large number of bits to the digital value of the total pixel signal S1. The bit reduction method determination unit 1205 outputs a bit reduction control signal representing reduction of the digital value of the 10-bit integer portion of selected pixel data output from the selection unit 1127 from 10 bits to 8 bits to the bit reduction unit 1103. With this, for example, as shown in FIG. 8A, the bit reduction unit 1103 divides the digital value of the 10-bit integer portion of input selected pixel data by 4 to output a 9-bit digital value having the I-bit sign applied to an 8-bit digital value with lower-order 2 bits reduced as total pixel data to the transfer unit 131.

In a case where the examined entire dynamic range of the total pixel signal S1 is narrow, the bit reduction method determination unit 1205 determines to decrease the number of bits allocated to the digital value of the total pixel signal S1. The bit reduction method determination unit 1205 outputs a bit reduction control signal representing reduction of the digital value of the 10-bit integer portion of selected pixel data output from the selection unit 1127 from 10 bits to 7 bits to the bit reduction unit 1103. With this, for example, as shown in FIG. 8B, the bit reduction unit 1103 divides the digital value of the 10-bit integer portion of input selected pixel data by 8 to output an 8-bit digital value having a 1-bit sign applied to a 7-bit digital value with lower-order 3 bits reduced as total pixel data to the transfer unit 131.

Figure 8C:
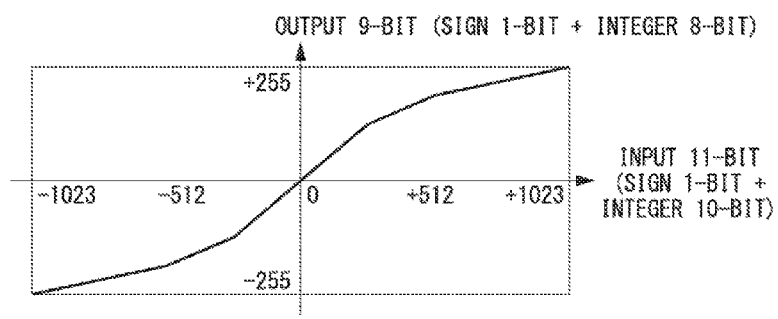
Figure 8D:
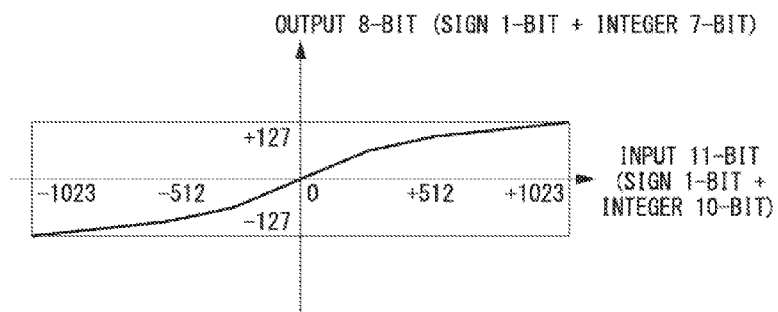

FIG. 8C shows a reduction example of the number of bits of selected pixel data in a case where the dynamic range is wide in the allocation of the range of the bits in a case where the examined entire brightness distribution of the total pixel signal S1 represents dark as a whole. FIG. 8D shows a reduction example of the number of bits of selected pixel data in a case where the dynamic range is narrow in the allocation of the range of the bits in a case where the examined entire brightness distribution of the total pixel signal S1 represents dark as a whole. That is, FIGS. 8C and 8D show a reduction example of the number of bits in which the first bit reduction method and the second bit reduction method are combined.

Specifically, in a case where the examined entire brightness distribution of the total pixel signal S1 represents dark as a whole, the bit reduction method determination unit 1205 determines to allocate the range of a larger number of bits by a digital value (a digital value having a value close to 0) of the total pixel signal S1 representing a dark value and the range of a small number of bits to a digital value (a digital value having a value far from 0) of the total pixel signal S1 representing a bright value to reduce the number of bits. In a case where the examined entire dynamic range of the total pixel signal S1 is wide, the bit reduction method determination unit 1205 determines to allocate a large number of bits to the digital value of the total pixel signal S1. The bit reduction method determination unit 1205 outputs a bit reduction control signal representing reduction of the number of bits of the digital value of the 10-bit integer portion of selected pixel data output from the selection unit 1127 to an 8-bit digital value having a different value according to the digital value of the 10-bit integer portion to the bit reduction unit 1103. With this, for example, as shown in FIG. 8C, the bit reduction unit 1103 outputs a 9-bit digital value having a 1-bit sign applied to the 8-bit digital value with lower-order 1 bit to 4 bits reduced according to the digital value of the 10-bit integer portion of input selected pixel data as total pixel data to the transfer unit 131.

In a case where the examined entire brightness distribution of the total pixel signal S1 represents dark as a whole and the entire dynamic range is narrow, the bit reduction method determination unit 1205 determines to decrease the number of bits allocated to the digital value of the total pixel signal S1 by a method of allocating the range of a larger number of bits by a digital value (a digital value having a value close to 0) of the total pixel signal S1 representing a dark value and the range of a small number of bits to a digital value (a digital value having a value far from 0) of the total pixel signal S1 representing a bright value. The bit reduction method determination unit 1205 outputs a bit reduction control signal representing reduction of the number of bits of the digital value of the 10-bit integer portion of selected pixel data output from the selection unit 1127 to a 7-bit digital value having a different value according to the digital value of the 10-bit integer portion to the bit reduction unit 1103. With this, for example, as shown in FIG. 8D, the bit reduction unit 1103 outputs an 8-bit digital value having a 1-bit sign applied to the 7-bit digital value with lower-order 2 bits to 5 bits reduced according to the digital value of the 10-bit integer portion of input selected pixel data as total pixel data to the transfer unit 131.

In the solid-state imaging device 12 of the third embodiment, in a case where the digital value of the difference between the total pixel signal S1 and the reduced pixel signal S2 selected as selected pixel data by the selection unit 1127 becomes total pixel data, the number of bits is reduced, and the digital value is transferred (output) to the imaging processing unit 210 in the image processing unit 20, in the imaging processing unit 210, it is necessary to restore the digital value of the total pixel signal S1. For this reason, information of the bit reduction method for reducing the number of bits of output total pixel data is required. Information of the bit reduction method can be obtained, for example, when the imaging processing unit 210 performs the same processing as the determination processing of the bit reduction method in the bit reduction method determination unit 1205 based on reduced pixel data output ahead from the solid-state imaging device 12 of the third embodiment. When the solid-state imaging device 12 of the third embodiment outputs total pixel data with the reduced number of bits, information of the bit reduction method may be added. In this case, for example, information of the bit reduction method may be included in information of the header or the footer of total pixel data transferred by an LVDS system and may be transferred along with total pixel data. For example, in order to set the operation of the solid-state imaging device 12 of the third embodiment, information of the bit reduction method may be transferred using a register accessed by the CPU 260 in the image processing unit 20 provided in the imaging system 1 with the solid-state imaging device 13 mounted therein or serial communication.

According to the third embodiment, the solid-state imaging device (solid-state imaging device 12) further includes the difference calculation unit (difference calculation unit 1126) which outputs the digital value of the difference between the digital value representing the amount of the total pixel signal S1 and the digital value representing the amount of the reduced pixel signal S2. The bit reduction unit 1103 reduces the number of bits of the digital value of the difference based on the bit reduction method and outputs the digital value of the difference with the reduced number of bits as the digital value (pixel data) corresponding to the total pixel signal S1.

As described above, in the solid-state imaging device 12 of the third embodiment, similarly to the solid-state imaging device 10 of the first embodiment and the solid-state imaging device 11 of the second embodiment, the number of bits of output total pixel data is controlled to a proper number of bits based on the feature of the image examined in advance.

For this reason, in the solid-state imaging device 12 of the third embodiment, similarly to the solid-state imaging device 10 of the first embodiment and the solid-state imaging device 11 of the second embodiment, even in a case where the number of bits of output total pixel data is reduced, it is possible to achieve both of reduction of the power consumption of the solid-state imaging device 12 of the third embodiment and suppression of image quality deterioration.

In the solid-state imaging device 12 of the third embodiment, the digital value of the difference between the digital value of the total pixel signal S1 read from the pixel signal processing unit 100 and the digital value of the reduced pixel signal S2, that is, the digital value with the edge component of the total pixel signal S1 extracted may be output as total pixel data with the reduced number of bits. It is generally known that the reduction of the number of bits to the digital value of the edge component has less image quality deterioration as a similar approach is applied in JPEG compression processing as still image compression processing. For this reason, in the solid-state imaging device 12 of the third embodiment, it is possible to further suppress image quality deterioration compared to total pixel data in the solid-state imaging device 10 of the first embodiment and the solid-state imaging device 11 of the second embodiment.

For example, if the number of bits of total pixel data output from each of the solid-state imaging device 12 of the third embodiment and the solid-state imaging device 10 of the first embodiment and the solid-state imaging device 11 of the second embodiment is the same, the image quality of an image generated based on total pixel data output from the solid-state imaging device 12 of the third embodiment can be further improved. If images generated based on total pixel data output from the solid-state imaging device 12 of the third embodiment and the solid-state imaging device 10 of the first embodiment and the solid-state imaging device 11 of the second embodiment have the same image quality, the solid-state imaging device 12 of the third embodiment can further reduce the number of bits of total pixel data.

In the reduction method of the number of bits in the solid-state imaging device 12 of the third embodiment, the reduction method of the number of bits in a case where the digital value of the difference between the total pixel signal S1 and the reduced pixel signal S2 is selected as selected pixel data by the selection unit 1127 has been described. However, in the solid-state imaging device 12 of the third embodiment, the selection unit 1127 may select the digital value of the total pixel signal S1 sequentially input from the first A/D conversion unit 1102 as selected pixel data. In this case, the operation of the solid-state imaging device 12 of the third embodiment is the same as the operation of the solid-state imaging device 11 of the second embodiment. Accordingly, in the solid-state imaging device 12 of the third embodiment, detailed description of the operation in a case where the selection unit 1127 selects the digital value of the total pixel signal S1 sequentially input from the first A/D conversion unit 1102 as selected pixel data will be omitted.

As described above, according to the embodiment for carrying out the invention, each of the pixel signals according to the signal charges of all pixels provided in the pixel signal processing unit and each of the pixel signals with the number of pixels provided in the pixel signal processing unit reduced obtained from the pixel signal processing unit of the solid-state imaging device with the same exposure are separately output. According to the embodiment for carrying out the invention, the feature of a captured image is examined in advance based on the pixel signals with the number of pixels provided in the pixel signal processing unit reduced, and the method of reducing the number of bits of the digital value (total pixel data) obtained by performing analog-to-digital conversion on each of the pixel signals according to the signal charges of all pixels provided in the pixel signal processing unit is controlled based on the examined feature of the image. With this, in the embodiment for carrying out the invention, it is possible to suppress deterioration of image quality with reduction of the number of bits of pixel data rather than reduction of the number of bits of pixel data according to the operation mode, like a conventional solid-state imaging device including a mechanism for changing the number of bits of pixel data, and to achieve both of reduction of power consumption and suppression of image quality deterioration with reduction of the number of bits of total pixel data.

According to the embodiment for carrying out the invention, the digital value (total pixel data) with the reduced number of bits obtained by performing analog-to-digital conversion on each of the pixel signals according to the signal charges of all pixels provided in the pixel signal processing unit and the digital value (reduced pixel data) obtained by performing analog-to-digital conversion on the pixel signal with the number of pixels provided in the pixel signal processing unit reduced are output. With this, in the embodiment for carrying out the invention, the digital value of each of the pixel signals with the number of pixels provided in the pixel signal processing unit reduced can be used for processing requiring real time performance.

In this embodiment, the pixel signal processing unit 100 provided in the solid-state imaging device of each of the first to third embodiments includes the second charge storage circuit 104 which holds the signal charge obtained by averaging the charge amount of each signal charge generated by the corresponding photoelectric conversion unit 101. However, the configuration of the pixel signal processing unit provided in the solid-state imaging device of the invention is not limited to the configuration of the pixel signal processing unit 100 provided in the solid-state imaging device of each of the first to third embodiments. For example, the signal charge obtained by averaging each signal charge held in the second charge storage circuit 104 and generated by the corresponding pixel may be further averaged.

In this embodiment, in the pixel signal processing unit 100 provided in the solid-state imaging device of each of the first to third embodiments, although an example of a configuration in which two prescribed pixels are constituted as a set has been described, a set of pixels in the pixel signal processing unit provided in the solid-state imaging device is not limited to the configuration of the embodiment for carrying out the invention. That is, more pixels than the configuration shown in the embodiment for carrying out the invention may be constituted as a set.

The number of pixels provided in the pixel signal processing unit 100 or the number of pixels to be reduced is not limited to the embodiment for carrying out the invention, and the number of pixels provided in the pixel signal processing unit 100 or the number of pixels to be reduced may be changed without departing from the spirit of the invention.

In this embodiment, a structure in which the solid-state imaging device of each of the first to third embodiments or the components provided in each solid-state imaging device is not limited. For example, a multilayer substrate structure in which the components provided in each solid-state imaging device are disposed on a plurality of substrates, or a monolithic structure in which the components are disposed on a single substrate may be used.

Although the embodiments of the invention have been described referring to the drawings, a specific configuration is not limited to the embodiments, and various changes may be made without departing from the spirit and scope of the invention. The invention is not to be considered as being limited by the foregoing description, and is only limited by the scope of the appended claims.

What is claimed is:

1. A solid-state imaging device comprising:
a pixel signal processing unit which has a plurality of pixels disposed in a two-dimensional matrix, outputs each of pixel signals generated by all of the plurality of pixels disposed as a total pixel signal, and outputs each of the pixel signals generated by the plurality of pixels with the number of pixels reduced to a prescribed number of pixels as a reduced pixel signal;
a bit reduction method determination unit which determines a bit reduction method for reducing the number of bits of a digital value representing an amount of the total pixel signal based on the reduced pixel signal; and
a bit reduction unit which reduces the number of bits of the digital value based on the bit reduction method determined by the bit reduction method determination unit and outputs the digital value with the reduced number of bits as a digital value corresponding to the total pixel signal.

2. The solid-state imaging device according to claim 1, wherein the reduced pixel signal is a pixel signal obtained by averaging the pixel signals generated by a plurality of corresponding pixels among the plurality of pixels in a same exposure period.

3. The solid-state imaging device according to claim 2, further comprising:
a difference calculation unit which outputs a digital value of a difference between the digital value representing the amount of the total pixel signal and a digital value representing an amount of the reduced pixel signal,
wherein the bit reduction unit reduces the number of bits of the digital value of the difference based on the bit reduction method and outputs the digital value of the difference with the reduced number of bits as the digital value corresponding to the total pixel signal.

4. The solid-state imaging device according to claim 1, wherein the reduced pixel signal is a pixel signal generated by one prescribed pixel among the pixel signals generated by a plurality of corresponding pixels among the plurality of pixels in a same exposure period.

5. The solid-state imaging device according to claim 4, further comprising:
a difference calculation unit which outputs a digital value of a difference between the digital value representing the amount of the total pixel signal and a digital value representing an amount of the reduced pixel signal,
wherein the bit reduction unit reduces the number of bits of the digital value of the difference based on the bit reduction method and outputs the digital value of the difference with the reduced number of bits as the digital value corresponding to the total pixel signal.

6. The solid-state imaging device according to claim 1, wherein the bit reduction method determination unit examines an entire dynamic range of the total pixel signal based on the reduced pixel signal and determines the number of bits allocated to the digital value corresponding to the total pixel signal according to a level of the examined dynamic range.

7. The solid-state imaging device according to claim 1, wherein the bit reduction method determination unit examines an entire brightness distribution of the total pixel signal based on the reduced pixel signal and determines a range of bits allocated to the digital value corresponding to the total pixel signal based on the examined brightness distribution.

8. The solid-state imaging device according to claim 1, wherein the bit reduction method determination unit examines an entire contrast value of the total pixel signal based on the reduced pixel signal and determines the number of bits allocated to the digital value corresponding to the total pixel signal according to a level of the examined contrast value.

9. An imaging system comprising:
the solid-state imaging device according to claim 1, wherein the bit reduction method determination unit determines the bit reduction method based on information representing conditions for performing imaging with the solid-state imaging device in addition to the reduced pixel signal.

10. The imaging system according to claim 9, wherein the information representing the conditions for performing imaging is control information of a lens including at least one of aperture information and focusing information of the lens which forms an optical image of an object on the solid-state imaging device.

* * * * *